(12) United States Patent
Nakai

(10) Patent No.: US 7,697,401 B2
(45) Date of Patent: Apr. 13, 2010

(54) OPTICAL HEAD DEVICE AND OPTICAL DISK APPARATUS

(75) Inventor: Kenya Nakai, Kyoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 832 days.

(21) Appl. No.: 11/579,451

(22) PCT Filed: May 18, 2005

(86) PCT No.: PCT/JP2005/009054

§ 371 (c)(1),
(2), (4) Date: Nov. 2, 2006

(87) PCT Pub. No.: WO2005/117003

PCT Pub. Date: Dec. 8, 2005

(65) Prior Publication Data

US 2008/0253267 A1    Oct. 16, 2008

(30) Foreign Application Priority Data

May 27, 2004 (JP) .............................. 2004-157730

(51) Int. Cl.
  *G11B 7/00* (2006.01)
(52) U.S. Cl. .............................................. 369/124.03
(58) Field of Classification Search .................. None
  See application file for complete search history.

(56) References Cited

U.S. PATENT DOCUMENTS 5,610,897 A * 3/1997 Yamamoto et al. ..... 369/124.03
6,771,450 B1 * 8/2004 Okuda et al. .................. 360/75
6,850,324 B1 * 2/2005 De Metz ...................... 356/336
7,283,439 B2 * 10/2007 Shimano et al. .......... 369/44.37

(Continued)

FOREIGN PATENT DOCUMENTS

JP    10-269611 A    10/1998

(Continued)

OTHER PUBLICATIONS

Tohru Kimura et al., Optics-photonics Design and Fabrication (ODF) 2002, Tokyo, Nov. 1, 2002, Technical Digest, pp. 83-84.

(Continued)

*Primary Examiner*—Joseph H Feild
*Assistant Examiner*—Parul Gupta
(74) *Attorney, Agent, or Firm*—Birch, Stewart, Kolasch & Birch, LLP

(57) ABSTRACT

An optical head device 201 includes a light source 1, an objective lens group 13, a two-dimensional actuator 15, spherical aberration adding means 9, 10, and 16, a hologram element 17 for splitting the light beam from the optical disk 14 into a plurality of split light beams, and a photodetector 22 which includes at least one photoreceptor including a plurality of split light receiving areas and outputs an electric signal corresponding to the light amount of a split light beam entering each of the plurality of split light receiving areas or an electric signal corresponding to a combination of the light amount of split light beams entering the corresponding split light receiving areas, and the plurality of split light beams split by the hologram element 17 include one circular ray U1 and at least two annular rays U2 and U3.

33 Claims, 22 Drawing Sheets

U.S. PATENT DOCUMENTS

| | | |
|---|---|---|
| 7,349,321 B2 * | 3/2008 | Kudo et al. ............ 369/124.03 |
| 2002/0056802 A1 | 5/2002 | Hiroyuki et al. |
| 2002/0145965 A1 | 10/2002 | Katayama |
| 2003/0035350 A1 | 2/2003 | Ogasawara et al. |
| 2004/0135062 A1 | 7/2004 | Ogasawara |

FOREIGN PATENT DOCUMENTS

| | | | |
|---|---|---|---|
| JP | 2002-157756 A | 5/2002 |
| JP | 2002-304762 A | 10/2002 |
| JP | 2002-367197 A | 12/2002 |
| JP | 2003-45048 A | 2/2003 |
| JP | 2004-133999 A | 4/2004 |

OTHER PUBLICATIONS

Charles S. William et al. Wiley-Interscience, pp. 337-341.

* cited by examiner

FIG.15A
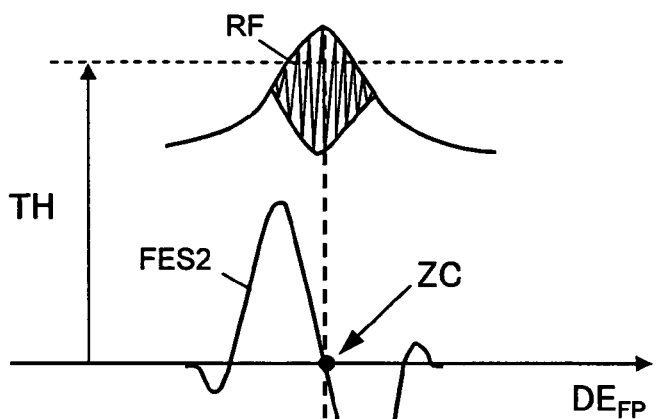
FIG.15B
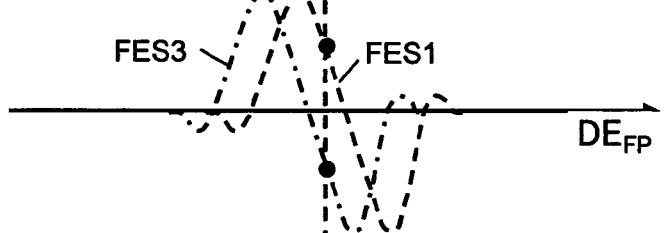
FIG.15C $S_{RF}$
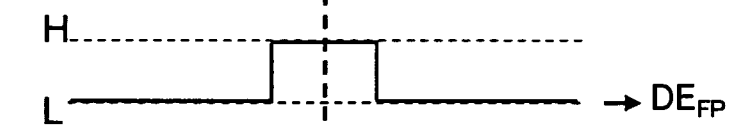
FIG.15D $F2_{Zero1}$
FIG.15E $F2_{Zero3}$
FIG.15F $F1_{Zero1}$
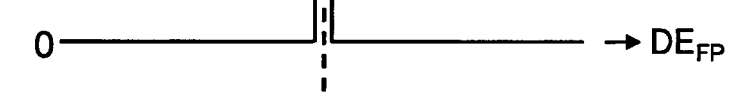
FIG.15G $F3_{Zero1}$

OPTICAL HEAD DEVICE AND OPTICAL DISK APPARATUS

TECHNICAL FIELD

The present invention relates to an optical head device for recording/reproducing information on a CD (Compact Disc), a DVD (Digital Versatile Disc), an MD (Mini Disc), an optical disk that allows higher-density recording, and the like, and an optical disk apparatus including the optical head device.

BACKGROUND ART

The optical head device is required to emit short-wavelength light and to have an objective lens with a high numerical aperture (high NA) in order to support high-density optical disks.

Usually, an increase in the NA of the objective lens increases aberration caused by an error in a thickness of a transparent substrate covering an information recording surface of an optical disk or a thickness of a layer between recording layers in a multilayer recording disk. This degrades the quality of light beams converged on the recording surface of the optical disk, thereby degrading the recording/reproducing quality and exerting a great influence on the quality of a defocus detection signal of an objective lens against an optical disk and the quality of a tracking error detection signal for detecting a deviation of a light beam converged on the recording surface of the optical disk from a recording track formed on the optical disk. In order to maintain the quality of these detection signals, the aberration must be detected and corrected or an optical system insusceptible to aberration must be provided.

Especially, in an optical disk apparatus with a high-NA objective lens, a substrate thickness error of an optical disk or a layer thickness error of an optical disk having a multilayer structure causes a great spherical aberration to be generated, thereby worsening the quality of the light converging spot of the light beam. Moreover, if an optical disk apparatus with a high-NA objective lens uses a representative defocus detection method for an objective lens, which is an astigmatic method or a knife edge method, the spherical aberration considerably degrades amplitude of a defocus detection signal, thereby destabilizing the focus servo operation performed by using the defocus detection signal and also destabilizing the seek operation because a modulation signal by a light converging spot traversing a recording track is unavailable.

Spherical aberration in an optical system needs to be optically suppressed or corrected in order to avoid these problems. There is a proposal for suppressing or correcting spherical aberration of the light beam converged on an optical disk by disposing a liquid-crystal phase corrector element which can generate a spherical aberration in an optical path (refer to Patent Document 1, for example). Further, there is a proposed method for suppressing or correcting the spherical aberration by disposing a group of lenses that can generate a spherical aberration depending on a lens-to-lens distance in an optical path to vary a lens-to-lens distance in accordance with the amount of spherical aberration (refer to Non-Patent Document 1, for example).

It is important for an accurate correction of the spherical aberration to detect the amount of spherical aberration in the optical system. There is a proposed method for detecting the spherical aberration, in which an inside ray and an outside ray of the light beam reflected by the optical disk are separately detected by the astigmatic method and the amount of spherical aberration is detected from the difference between the focus error signals respectively obtained from the inside ray and the outside ray (refer to Patent Document 2, for example). Further, by adopting the knife edge method, instead of the astigmatic method, to the inside ray and the outside ray of the light beam reflected from the optical disk, the amount of spherical aberration can also be detected from the difference between the defocus signals respectively generated from the inside ray and the outside ray (refer to Patent Document 2, for example).

Patent Document 1: Japanese Patent Application Publication No. H10-269611 (paragraphs 0021-0022, FIG. 1, and FIG. 2)

Patent Document 2: Japanese Patent Application Publication No. 2002-367197 (paragraphs 0010, 0020 to 0022, FIG. 2, and FIG. 3)

Non-Patent Document 1: Tohru Kimura et al., "Optical system for HD-DVD with plastic lenses", Optics-photonics Design and Fabrication (ODF) 2002, Tokyo, 1 Nov. 2002, Technical Digest, pp. 83-84

Non-Patent Document 2: Charles S. Williams and Orville A. Becklund, "Introduction to the optical transfer function", WILEY-INTERSCIENCE, pp. 337-341

DISCLOSURE OF INVENTION

Problems to be Solved by the Invention

However, if the detection optical system for the defocus detection method has spherical aberration, the amplitude of the defocus detection signal deteriorates significantly. The deterioration in the amplitude of the defocus detection signal causes problems as described below.

When an objective lens is moved in a direction of the optical axis or the like to cause a light converging spot to scan each recording layer of the optical disk, the waveform of the defocus detection signal in each recording layer can be continuously detected, so that the type of the optical disk can be judged by sensing the level of amplitude or the number of waveforms. If there is the spherical aberration as described above, the amplitude of the defocus detection signal depends on the magnitude of the spherical aberration, and the optical disk type is apt to be misjudged.

Further, even if the defocus detection signal can be detected and a focus servo operation can be started on the basis of the defocus detection signal, a greatly degraded defocus detection signal may bring circuit conditions such as a servo gain outside the optimum range. This makes the focus servo operation unstable, and may move the servo operation point, thereby generating great defocusing on the optical disk.

Furthermore, if defocusing on the optical disk increases, the modulation signal based on a record mark, a track guide groove, or the like deteriorates further, adversely affecting the recording/reproducing capabilities and seek capability.

Moreover, if the detection and correction of the spherical aberration is completed before the focus servo operation starts, the problems described above can be avoided. However, an optical configuration which enables the spherical aberration to be corrected cannot give optimum spherical aberration to all layers of the multilayer recording disk simultaneously. It is difficult to correct the spherical aberration to a target value accurately and quickly. Even if a correct defocus detection signal is obtained by correcting the spherical aberration of each recording layer as needed, it would take a long time to perform operations from a judgment of an optical disk type to a recording or reproduction operation.

A wide variety of optical disks such as a recorded disk, a non-recorded disk, a multilayer recording disk, and an inferior optical disk having a substrate thickness error may be inserted into an optical disk apparatus, and those types of optical disks should be immediately judged and a focus servo operation should be started in a desired recording layer.

The present invention has been provided to solve the problems in the above-mentioned conventional art, and an object of the present invention is to provide an optical head device that can detect defocusing with a defocus detection signal which deteriorates little even if spherical aberration occurs and an optical disk apparatus including the optical head device.

Means of Solving the Problem

According to the present invention, an optical head device includes a light source for emitting a light beam; a light converging means for converging the light beam onto an optical disk; a light converging spot moving means for moving a position of a focus of a light converging spot formed by the light beam converged by the light converging means, in a direction perpendicular to a recording surface of the optical disk; a light beam splitting means for splitting the light beam converged by the light converging means and reflected from the optical disk into a plurality of split light beams; and a light sensing means which includes at least one photoreceptor including a plurality of split light receiving areas, the light sensing means outputting an electric signal corresponding to a light amount of the split light beam entering each of the plurality of split light receiving areas or an electric signal corresponding to a combined light amount of the split light beams entering the plurality of split light receiving areas. The plurality of split light beams split by the light beam splitting means includes a circular ray or a pair of semi-circular rays; and at least two annular rays or at least two pairs of semi-annular rays, which are rays outside the circular ray or the semi-circular rays.

Effects of the Invention

The optical head device and the optical disk apparatus according to the present invention can prevent the deterioration of the amplitude of the defocus detection signal, which is used to occur in the conventional defocus detection method using the total ray when spherical aberration exists. Accordingly, a stable focus servo operation can be performed, and the servo circuit for performing the focus servo operation does not require gain readjustment, for example. Alternatively, even if the spherical aberration is not corrected completely, a layer-to-layer focus jump operation and a radial seek operation can be performed accurately, so that the operating rate can be improved.

Further, the optical head device and the optical disk apparatus according to the present invention can prevent the deterioration of the amplitude of the defocus detection signal, which is used to occur in the conventional defocus detection method using the total ray when spherical aberration exists. Accordingly, the number of the recording layers of the optical disk can be correctly detected, and the type of the optical disk can be correctly judged.

Furthermore, the optical head device and the optical disk apparatus according to the present invention can prevent the deterioration of the amplitude of the defocus detection signal, which is used to occur in the conventional defocus detection method using the total ray when spherical aberration exists. Accordingly, the number of the recording layers of the optical disk can be correctly counted.

Moreover, the optical head device and the optical disk apparatus according to the present invention do not degrade the amplitude of the defocus detection signal, even without a spherical aberration correction means for correcting spherical aberration of the reflected light from the optical disk, so that the costs can be reduced.

BRIEF DESCRIPTION OF THE DRAWINGS

FIGS. 15A to 15G are waveform diagrams provided to explain a method of generating a spherical aberration detection signal in the optical head device according to the first embodiment;

Figure 1:
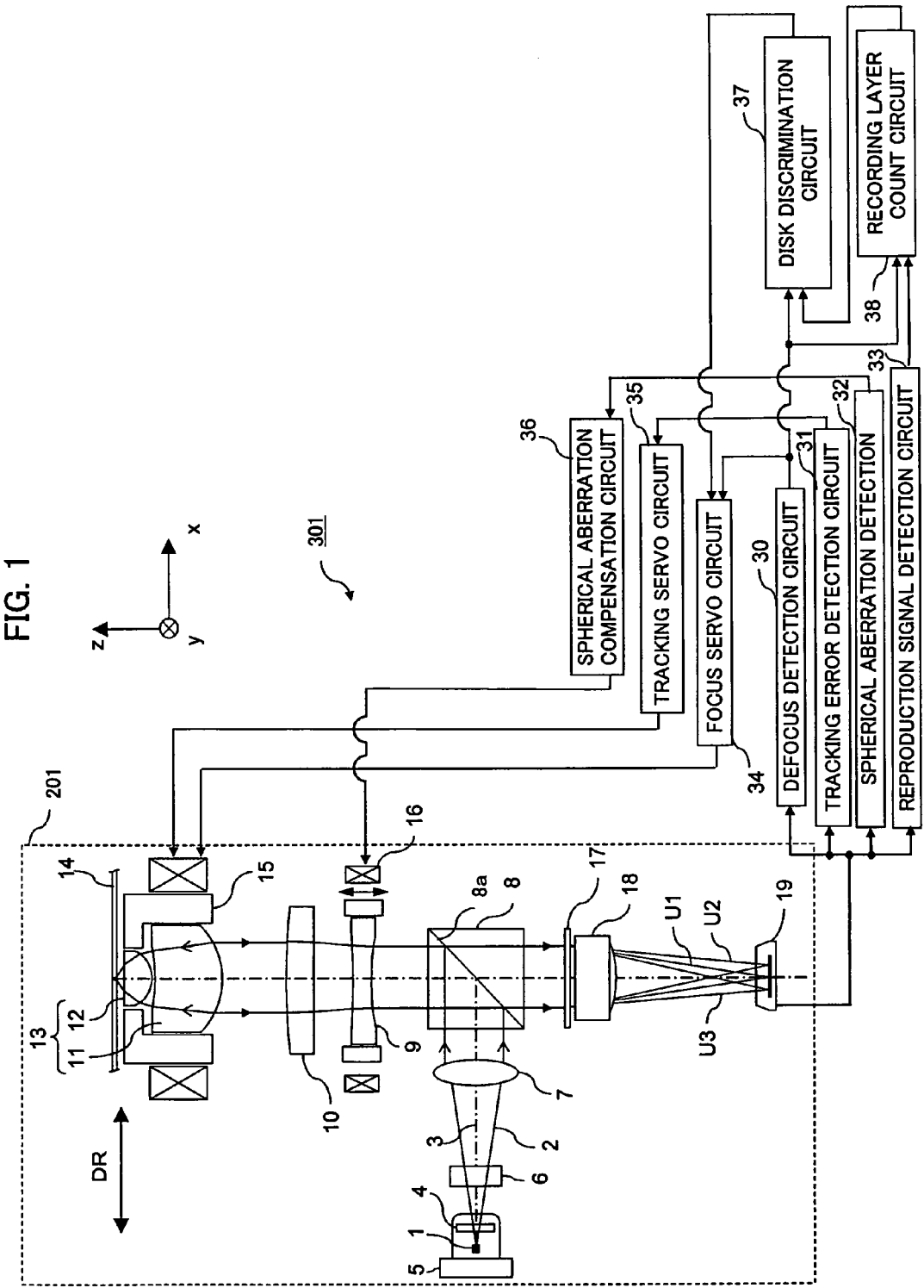
FIG. 1 is a diagram showing a basic configuration of an optical head device and an optical disk apparatus according to the first embodiment of the present invention.

DESCRIPTION OF REFERENCE CHARACTERS 1 semiconductor laser; 2 light beam; 3 central optical axis; 4 flat glass plate; 5 heat dissipation package; 6 diffraction grating element; 7 collimator lens; 8 deflection prism; 8a reflection surface; 9 first lens; 10 second lens; 11 third lens; 12 fourth lens; 13 objective lens group; 14 optical disk; 15 two-dimensional actuator; 16 spherical aberration correction means; 17 hologram element; 18 sensor optical element; 19 photodetector; 30 defocus detection circuit; 31 tracking error detection circuit; 32 spherical aberration detection circuit; 33 reproduction signal detection circuit; 34 focus servo circuit; 35 tracking servo circuit; 36 spherical aberration compensation circuit; 37 disk discrimination circuit; 38 recording layer count circuit; 101 polarizing hologram element; 102 quarter wavelength plate; 150 slice circuit; 151 positive/negative binarizing circuit; 152 differentiating circuit; 120, 121 beam shaping prism; 122, 123 liquid-crystal phase corrector; 124 quarter wavelength plate; 201, 201a, 202, 203 optical head device; 301, 301a, 302, 303 optical disk apparatus; FES1 first defocus detection signal; FES2 second defocus detection signal; FES3 third defocus detection signal; FES defocus detection signal.

BEST MODE FOR CARRYING OUT THE INVENTION

First Embodiment

FIG. 1 is a diagram showing a basic configuration of an optical head device 201 and an optical disk apparatus 301 including the optical head device according to the first embodiment of the present invention. As shown in FIG. 1, the optical head device 201 according to the first embodiment includes a semiconductor laser 1, which is a light source, a flat glass plate 4, which becomes an emission window through which a light beam 2 (a central optical axis of which is shown by a one-dot chain line 3) emitted from the semiconductor laser 1 is output, and a heat dissipation package 5. The heat dissipation package integrates the semiconductor laser 1 and a flat glass plate 4 and has a function of dissipating heat generated by the emission of the semiconductor laser 1.

Further, the optical head device 201 according to the first embodiment includes a diffraction element 6 for sharing the light beam 2 into a plurality of rays, a collimator lens 7 for converting the light beam 2 into almost parallel ray beam, a deflection prism 8 for deflecting the light beam 2 that passed the collimator lens 7 by means of an internal reflection surface 8a, a first lens 9, a second lens 10, a third lens 11, and a fourth lens 12. The light beam 2 deflected by the reflection surface 8a of the deflection prism 8 passes the first lens 9 and the second lens 10 and is then converged on an optical disk 14 by an objective lens group 13 including the third lens 11 and the fourth lens 12.

Furthermore, the optical head device 201 according to the first embodiment also includes a two-dimensional actuator 15 and a one-dimensional actuator 16 (or a feed motor). The two-dimensional actuator 15 can move the objective lens group 13 in a direction of the optical axis (z-axis direction in FIG. 1, almost perpendicular to the recording surface of the optical disk) and in a radial direction DR of the optical disk 14 (x-axis direction in FIG. 1, almost parallel to the recording surface of the optical disk). The one-dimensional actuator 16 moves the first lens 9 in a direction of the optical axis (z-axis direction in FIG. 1) to change a lens-to-lens distance between the first lens 9 and the second lens 10. The spherical aberration of the light beam can be corrected by the first lens 9, the second lens 10, and the one-dimensional actuator 16. The optical head device of the present invention is not limited to the configuration shown in FIG. 1.

The light beam 2 reflected by the optical disk 14 passes the fourth lens 12 and the third lens 11 again, then passes the second lens 10 and the first lens 9, and passes the deflection prism 8 (-z direction in FIG. 1).

Moreover, as shown in FIG. 1, the optical head device 201 according to the first embodiment also includes a hologram element 17, a sensor optical element 18, and a photodetector 19. The hologram element 17 splits or shares the light beam which is reflected by the optical disk 14 and passes the deflection prism 8 into at least two rays. The sensor optical element 18 has a lens function of collecting a plurality of rays split or shared by the hologram element 17, a function of adding aberration, and the like. The photodetector 19 includes at least one photoreceptor (for example, P1 shown in FIG. 3 which will be described later), which includes a plurality of split light receiving areas (for example, A1, B1, C1, and D1 in FIG. 3 which will be described later) and outputs an electric signal depending on the amount of light entering each of the plurality of split light receiving areas or an electric signal depending on a combination of the amounts of light entering the plurality of split light receiving areas. The sensor optical element 18 collects the ray split or shared by the hologram element 17 onto the light receiving surface of the photodetector 19. The deflection prism 8 may be a polarizing prism and a quarter wavelength plate (not shown in the figure) may be disposed between the polarizing prism and the first lens 9, in order to improve the transmission efficiency of the deflecting surface 8a and improve the optical utilization efficiency. Further, the hologram element 17 may be disposed on the two-dimensional actuator 15, together with the objective lens group 13. Furthermore, the hologram element may be replaced by a liquid crystal aperture element including a plurality of areas where the transmission or blocking of the input ray can be controlled.

The electric signal converted by the photodetector 19 goes through computations by the defocus detection circuit 30, the tracking error detection circuit 31, the spherical aberration detection circuit 32, and the reproduction signal detection circuit 33, which output their detection signals as voltage signals.

The defocus detection signal generated by the defocus detection circuit 30 is input to the focus servo circuit 34 for driving the two-dimensional actuator 15 in a focal direction (a z-axis direction in FIG. 1). The focus servo circuit 34 controls the operation of the two-dimensional actuator 15 in accordance with the input defocus detection signal.

The tracking error detection signal generated by the tracking error detection circuit 31 is input to the tracking servo circuit 35, which drives the two-dimensional actuator 15 in a radial direction DR of the optical disk 14 (i.e., an x-axis direction). The tracking servo circuit 35 controls the operation of the two-dimensional actuator 15 in accordance with the input tracking error detection signal.

The spherical aberration detection signal generated by the spherical aberration detection circuit 32 is input to the spherical aberration compensation circuit 36. The spherical aberration detection signal is used as a control signal for controlling the operation of the one-dimensional actuator 16 configured as a spherical aberration correction means for correcting a thickness error of the substrate of the optical disk 14, a spherical aberration caused by a layer-to-layer thickness difference of the multilayer recording disk, and an unnecessary spherical aberration caused by the optical system of the optical head device. When the one-dimensional actuator 16 operates and changes the lens-to-lens distance between the first lens 9 and the second lens 10, the light beam output from the second lens 10 can become parallel rays, diverging rays, or converging rays. Therefore, the change in the conditions of the light beam entering the objective lens group 13 included in the two-dimensional actuator 15 can give a desired spherical aberration to the light beam converged onto the optical disk 14.

The reproduction signal detection circuit 33 generates a reproduction signal for the data recorded on the optical disk 14.

The defocus detection signal generated by the defocus detection circuit 30 is input to the recording layer count circuit 38 for counting the number of waveforms of the defocus detection signal detected in each recording layer of a multilayer recording disk especially, and the recording layer count circuit 38 outputs the counted number of the recording layers. The disk discrimination circuit 37 judges the type of the optical disk 14 by choosing and adopting the characteristics of the optical disk such as the amplitude of the defocus detection signal generated by the defocus detection circuit 30 and the counted number of the recording layers output from the recording layer count circuit 38.

Figure 2:
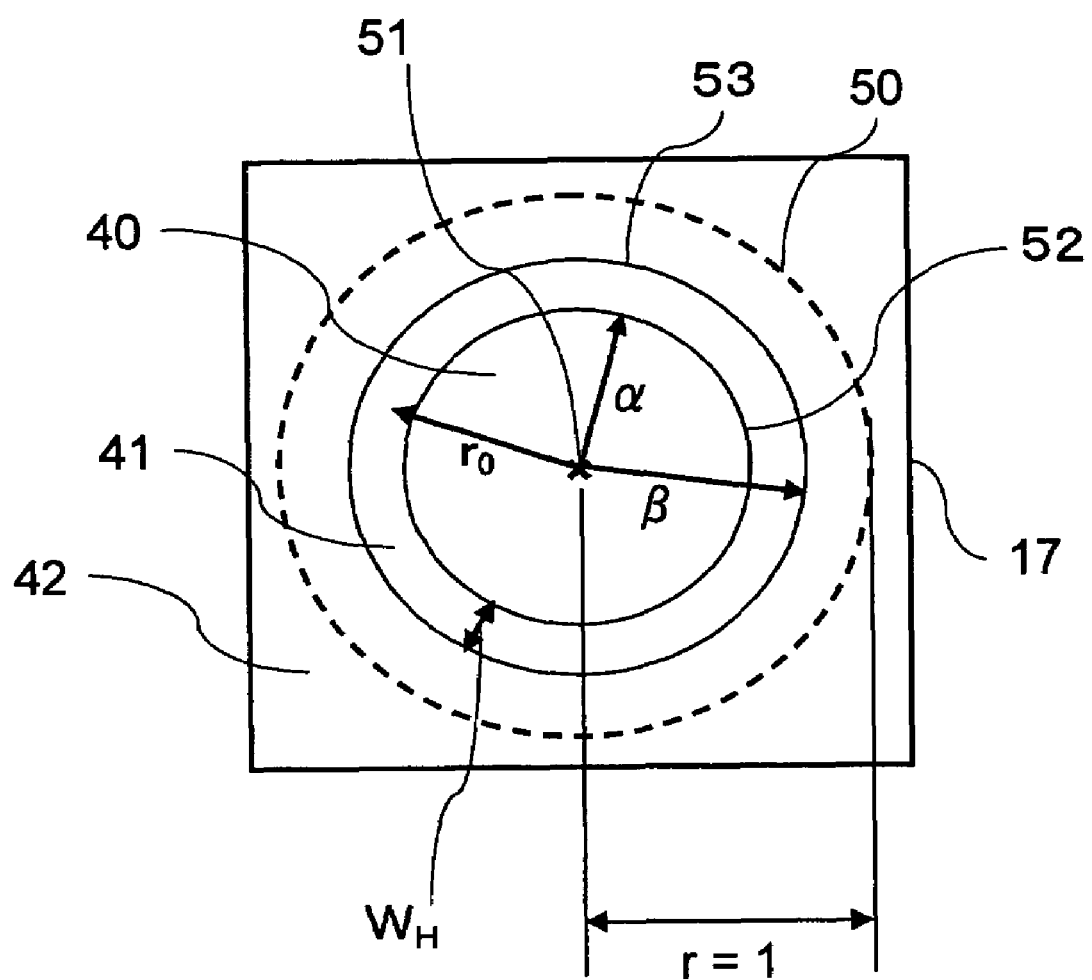
FIG. 2 is a schematic plan view showing a division pattern of a hologram element in the optical head device according to the first embodiment.

FIG. 2 is a schematic diagram showing a division pattern of the hologram element 17. In FIG. 2, a circle 50 drawn by a broken line on the hologram element 17 indicates an outermost edge of an effective ray of the objective lens group 13, and an area inside the circle 50 represents an area corresponding to numerical aperture $NA_{OBJ}$ of the objective lens group 13. A central point 51 marked with a cross in FIG. 2 is a position of the designed central optical axis of the light beam on the hologram element 17, and the hologram element 17 has a division pattern including three concentric areas about the point 51. In the description given below, a radius from the designed central optical axis 51 on the hologram element 17 is represented with respect to a normalized radius 'r' of the ray corresponding to the numerical aperture $NA_{OBJ}$ of the objective lens group 13 (a radius normalized to set the radius 'r' of the outermost edge to 1), and the area of the ray is defined using the normalized radius r.

As shown in FIG. 2, the hologram element 17 includes three areas, a first area 40, a second area 41, and a third area 42. The first area 40 is an area of which a normalized radius 'r' from the designed central optical axis 51 is smaller than α (an area of $0 \leq r < \alpha$, which is an area inside a circle 52 shown in FIG. 2). The second area 41 is an area of which a normalized radius 'r' is greater than or equal to α and smaller than β (an area of $\alpha \leq r < \beta$, which is an area between the circle 52 and the circle 53 in FIG. 2). The third area 42 is an area of which a normalized radius 'r' is greater than or equal to β (an area of $\beta \leq r$, which is an area outside the circle 53 inclusive in FIG. 2). The possible ranges of the values of α and β are $0 \leq \alpha < 1$ and $0 < \beta \leq 1$, and $\alpha < \beta$ is satisfied. The width $W_H$ of the second area 41 can be expressed as $$W_H = \beta - \alpha.$$

An intermediate radius $r_0$ of the second area 41 can be expressed as $$r_0 = (\alpha + \beta)/2.$$

The first area 40, the second area 41, and the third area 42 of the hologram element 17 have diffraction gratings respectively. The grating spacing, grating shape, grating orientation, and the like are optimized in the first area 40, the second area 41, and the third area 42 to divide the light beam entering the hologram element 17 into rays of the areas and to diffract the rays to different directions. Almost all the rays split by the first area 40, the second area 41, and the third area 42 are converged by the sensor optical element 18 onto the corresponding photoreceptors (P1, P2, and P3 in FIG. 3, which will be described later) of the photodetector 19. With respect to the shown division pattern, the rays shared and diffracted in the first area 40, the second area 41, and the third area 42 are referred to as the first ray U1, the second ray U2, and the third ray U3.

Figure 3:
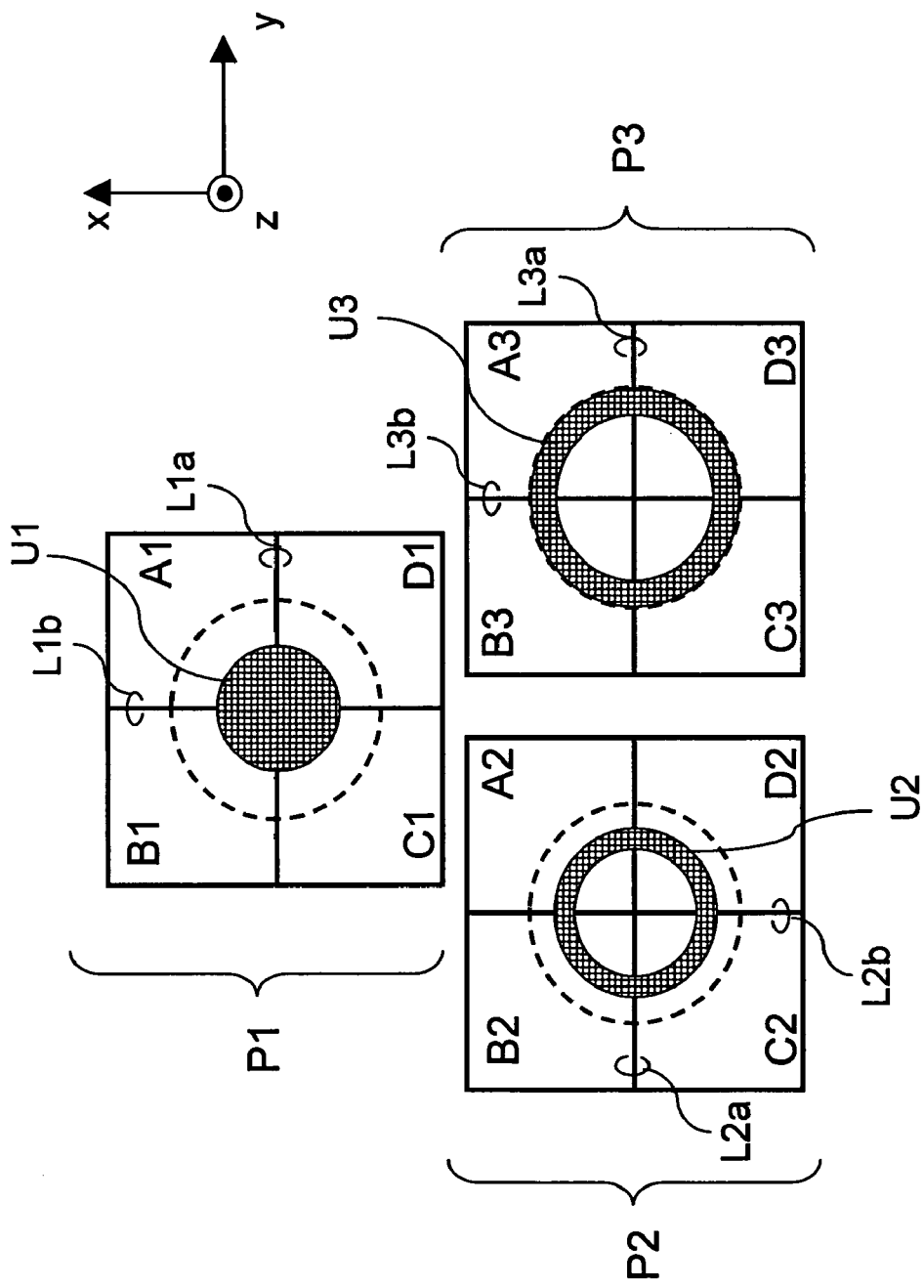
FIG. 3 is a schematic diagram showing four-division light-receiving area patterns of three photoreceptors of a photodetector in the optical head device according to the first embodiment and the ray on each photoreceptor.

FIG. 3 is a schematic diagram showing the pattern of the light receiving areas of the photodetector 19 and the first, second, and third rays U1, U2, and U3 respectively converged on the photoreceptors P1, P2, and P3 of the photodetector 19. The pattern of the light receiving areas of the photoreceptors P1, P2, and P3 of the photodetector 19 shown in FIG. 3 is obtained when the hologram element 17 having the division pattern as shown in FIG. 2 is used.

If the hologram element 17 has a division pattern as shown in FIG. 2, the photodetector 19 includes the first, second, and third photoreceptors P1, P2, and P3, as shown in FIG. 3. Each of the first, second, and third photoreceptors P1, P2, and P3 includes four light receiving areas. Of the rays shared and diffracted by the hologram element 17, the first, second, and third rays U1, U2, and U3 are respectively received by the first, second, and third photoreceptors P1, P2, and P3, as shown in FIG. 3. The photodetector 19 is disposed in such a manner that the separation boundaries L1$a$, L2$a$, and L3$a$ of the first, second, and third rays U1, U2, and U3 respectively become almost parallel to a tangential direction of the optical disk 14 (a y-axis direction in FIG. 1), and the separation boundaries L1$b$, L2$b$, and L3$b$ of the photoreceptors P1, P2, and P3 become almost parallel to a radial direction DR of the optical disk 14 (an x-axis direction in FIG. 1). The first photoreceptor P1 includes four light receiving areas A1, B1, C1, and D1 separated by the separation boundaries L1$a$ and L1$b$. The second photoreceptor P2 includes four light receiving areas A2, B2, C2, and D2 separated by the separation boundaries L2$a$ and L2$b$. The third photoreceptor P3 includes four light receiving areas A3, B3, C3, and D3 separated by the separation boundaries L3$a$ and L3$b$. In the description given below, reference characters A1 to A3, B1 to B3, C1 to C3, and D1 to D3 are used also as the values of the detection signals of the corresponding light receiving areas.

If an element with an additional astigmatic function such as a cylindrical lens is used as the sensor optical element 18, defocus detection like astigmatic defocus detection, which has been used often, can be carried out for each of the first, second, and third rays U1, U2, and U3. In other words, if the sensor optical element 18 generating astigmatism of which magnitude depends on the defocus detection range is disposed in such a manner that the focal line becomes oblique to the x-axis direction or the y-axis direction and the light receiving surface is disposed in such a position in the direction of the optical axis (that is, the z-axis direction) that the first, second, and third rays U1, U2, and U3 become almost the least circle of confusion, the waveform of the astigmatic defocus detection signal generated on the optical disk 14 can be obtained from the first, second, and third rays U1, U2, and U3.

The first, second, and third defocus detection signals FES1, FES2, and FES3 respectively generated by the first, second, and third photoreceptors P1, P2, and P3 can be obtained by Expression 1, Expression 2, and Expression 3 below:

$$FES1=(A1+C1)-(B1+D1) \quad (1)$$

$$FES2=(A2+C2)-(B2+D2) \quad (2)$$

$$FES3=(A3+C3)-(B3+D3) \quad (3)$$

Further, the defocus detection signal FES in the conventional the astigmatic method can be equivalently obtained by Expression 4 below:

$$FES=FES1+FES2+FES3 \quad (4)$$

With the configuration as described above, if the photodetector 19 is adjusted in the direction of the optical axis (a z-axis direction) in such a manner that the defocus detection signal FES becomes zero when the spherical aberration of the optical system is almost zero and there is no defocusing on the optical disk 14, the light intensity distribution of the first, second, and third rays U1, U2, and U3 on the light receiving surface becomes almost as shown in FIG. 3. In other words, the first, second, and third defocus detection signals FES1, FES2, and FES3 become almost zero.

With a configuration of $\alpha=0$, the first ray U1 virtually disappears, and the first photoreceptor P1 may be eliminated. Further, with a configuration of $\beta=1$, the third ray U3 virtually disappears, and the third photoreceptor P3 may be eliminated. Furthermore, with a configuration of $\alpha=\beta$, the second ray U2 virtually disappears, and the second photoreceptor P2 may be eliminated.

Further, with the push-pull method of the first, second, and third photoreceptors P1, P2, and P3, the first, second, and third tracking error detection signals TES1, TES2, and TES3 can be obtained by Expression 5 to Expression 7 below:

$$TES1=(A1+D1)-(B1+C1) \quad (5)$$

$$TES2=(A2+D2)-(B2+C2) \quad (6)$$

$$TES3=(A3+D3)-(B3+C3) \quad (7)$$

The tracking error detection signal TES can be obtained by Expression 8 below:

$$TES=TES1+TES2+TES3 \quad (8)$$

Furthermore, a tracking error may also be detected by the DPD (differential phase detection) method, which uses phase comparison between the output signals from the two adjacent light receiving areas in a radial direction DR or the two sum signals output from the diagonal light receiving areas, in each of the first, second, and third photoreceptors P1, P2, and P3.

In the usual push-pull method, the difference in the amount of received light between the two areas divided by the diameter in the direction corresponding to the tangential direction of the optical disk is calculated. If the detection is made in an optical path shared with the astigmatic defocus detection system, in the same manner as the optical configuration shown in FIG. 1, the diameter in the tangential direction in the least circle of confusion by the astigmatic method is rotated by 90 degrees to the x-axis direction shown in FIG. 1.

The reproduction signal detection circuit 33 calculates a reproduction signal RF by Expression 9 below:

$$RF=(A1+A2+A3)+(B1+B2+B3)+(C1+C2+C3)+(D1+D2+D3) \quad (9)$$

In the description given above, the first-order diffracted light beam diffracted in each of the first, second, and third areas 40, 41, and 42 of the hologram element 17 is shown, but a higher-order diffracted light beam can be considered in the same manner.

Further, the defocus detection circuit 30, the tracking error detection circuit 31, the spherical aberration detection circuit 32, and the reproduction signal detection circuit 33 may be integrated into the photodetector 19 as a semiconductor integrated circuit.

Figure 4:
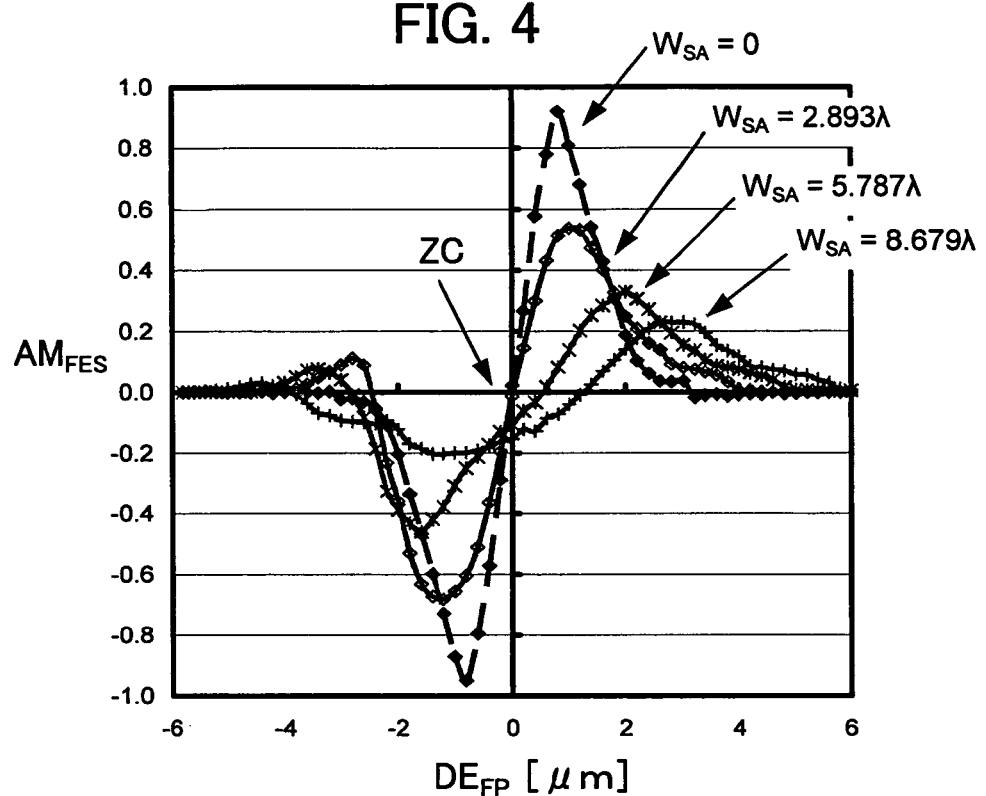
FIG. 4 is a diagram showing waveforms of the defocus detection signal detected by an optical head device of an example for comparison.

FIG. 4 is a diagram showing waveforms of the defocus detection signal detected by an optical head device as an example for comparison with the present invention. In FIG. 4, the horizontal axis represents defocusing $DE_{FP}$ (μm) on the optical disk. The zero point indicates that the focus position is on the information recording surface of the optical disk; a point to the right of the zero point (positive side) indicates that the focus position is closer than the information recording surface of the optical disk; and a point to the left of the zero point (negative side) indicates that the focus position is further than the information recording surface of the optical disk. In FIG. 4, the vertical axis represents the amplitude $AM_{FES}$ of the defocus detection signal FES, and a point where $AM_{FES}$ is 0 is a zero-crossing point ZC. FIG. 4 shows an example of calculated waveforms of the defocus detection signal FES (i.e., a signal corresponding to FES1+FES2+FES3) detected by the conventional astigmatic method when the optical system has spherical aberration. The amplitude of the signal attenuates and deteriorates greater when the optical system has spherical aberration than when there is no spherical aberration (i.e., when spherical aberration $W_{SA}$ is 0). FIG. 4 shows an example when an objective lens numerical aperture $NA_{OBJ}$ is 0.85 and a wavelength λ is 405 nm. This signal deterioration occurs because of the following: spherical aberration generates a difference in image formation position between the inside ray near the center of the ray and the perimeter ray near the outermost edge of the ray, and if the defocus detection is conducted in a mixture of the inside ray and the perimeter ray, the rays cancel out each other.

When an increase in spherical aberration attenuates amplitude $AM_{FES}$ of the defocus detection signal, as shown in FIG. 4, the focus servo operation becomes unstable, and the system becomes complicated. For example, the circuit gain of the focus servo circuit 34 must be readjusted when the focus servo operation starts.

The optical disks come in many types: Some have various substrate thicknesses and some other have a multilayer recording structure. Accordingly, an optical disk apparatus including an optical head device must judge the type of the optical disk correctly. This judgment is made in accordance with characteristics found by observing the amplitude $AM_{FES}$ and the number of waveforms of the defocus detection signal detected when the light beam is reflected by each recording layer of the optical disk. However, if the judgment is made in accordance with the defocus detection signal detected by the conventional astigmatic method, as shown in FIG. 4, problems occur as described below.

The recording layer count circuit 38 judges the presence or absence of a recording layer by observing whether the amplitude of the defocus detection signal detected in each recording layer exceeds a predetermined threshold level in the recording layer count circuit 38. Accordingly, if the amplitude of the signal deteriorates as shown in FIG. 4, the threshold level may not be exceeded, and a counting error is likely to occur.

The disk discrimination circuit 37 also judges the type of the optical disk by determining the level of amplitude with reference to the threshold level in the same manner as the recording layer count circuit 38 or by measuring the level of amplitude through sampling or the like. Accordingly, the amplitude deterioration as in FIG. 4 is likely to cause a judgment error.

Figure 5:
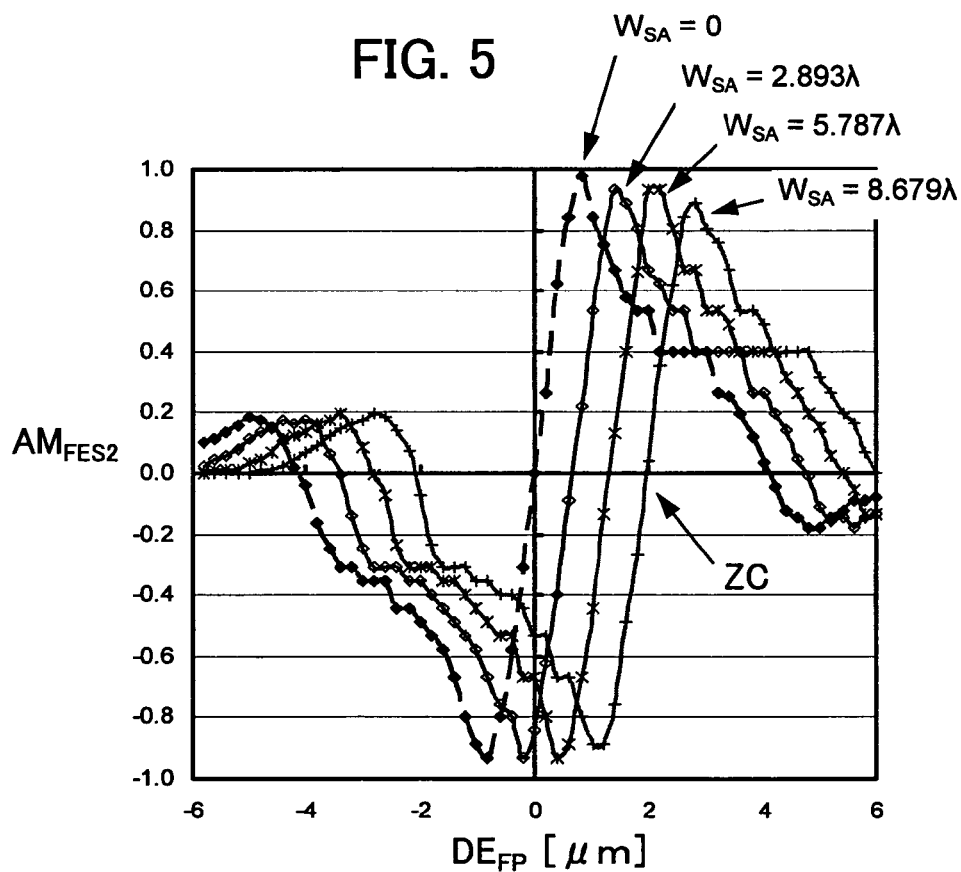
FIG. 5 is a diagram showing waveforms of the defocus detection signal detected by the optical head device according to the first embodiment by using an annular ray (in a case where the division pattern of the hologram element is set as $\alpha=0.32$ and $\beta=0.42$)
Figure 6:
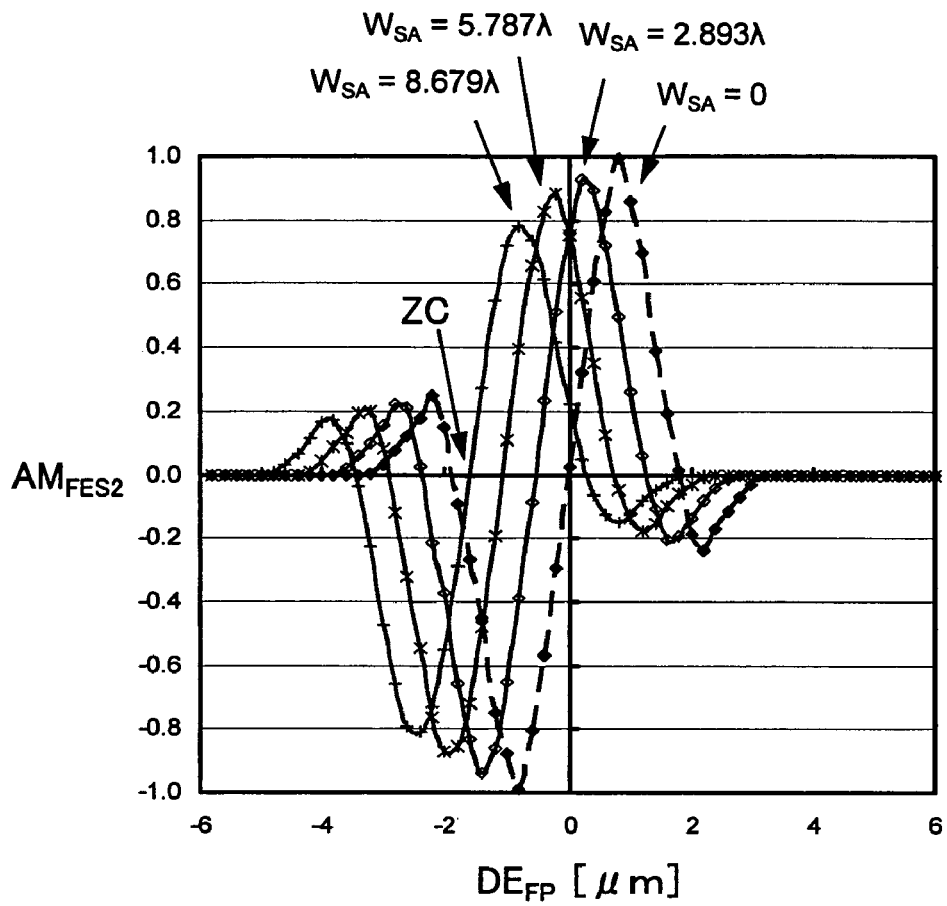
FIG. 6 is a diagram showing waveforms of the defocus detection signal detected by the optical head device according to the first embodiment by using an annular ray (in a case where the division pattern of the hologram element is set as $\alpha=0.84$ and $\beta=0.94$)

FIG. 5 is a diagram showing waveforms of the second defocus detection signal FES2 detected by the optical head device 201 according to the first embodiment of the present invention by using an annular ray (calculated waveforms when the division pattern of the hologram element is set as α=0.32 and β=0.42). FIG. 6 is a diagram showing waveforms of the second defocus detection signal FES2 detected by the optical head device 201 according to the first embodiment of the present invention by using an annular ray (calculated waveforms when the division pattern of the hologram element is set as α=0.84 and β=0.94). In FIG. 5 and FIG. 6, the horizontal axis represents the amount of the defocusing $DE_{FP}$ (μm) on the optical disk. The zero point indicates that the focus position is on the information recording surface of the optical disk; a point to the right of the zero point (positive side) indicates that the focus position is closer than the information recording surface of the optical disk; and a point to the left of the zero point (negative side) indicates that the focus position is further than the information recording surface of the optical disk. In FIG. 5 and FIG. 6, the vertical axis represents amplitude $AM_{FES2}$ of the defocus detection signal FES2. A point where $AM_{FES2}$ is 0 is a zero-crossing point ZC.

The second defocus detection signal FES2 shown in FIG. 5 and FIG. 6 is obtained by the second ray U2 of the second area 41 of the hologram element 17 and is calculated under the same conditions as in FIG. 4 (an example for comparison).

If the range of the second ray U2 used for defocus detection is limited to reduce the change in phase in the range of the ray, the canceling described with reference to FIG. 4 (an example for comparison) can be reduced and the degradation in the defocus detection signal can be suppressed.

When the second defocus detection signal FES2 obtained as described above is input to the recording layer count circuit 38 or the disk discrimination circuit 37, signal amplitude deterioration caused by spherical aberration can be reduced than when the conventional method using the defocus detection signal FES (FIG. 4) is adopted (an increase in the value of $W_{SA}$ will not decrease the amplitude $AM_{FES2}$ of the FES2 signal, in FIG. 5 and FIG. 6). Accordingly, an optical disk judgment error and a recording layer counting error can be avoided.

Further, in a system where spherical aberration is corrected while the quality of the RF signal or the level of amplitude of the modulation signal at a traversing of a groove or the tracking signal is being monitored after the focus servo operation starts, a capability of starting the focus servo operation immediately without adjusting any spherical aberration is desired to speed up the operation.

If the defocus detection signal FES shown in FIG. 4 is used as an input signal of the focus servo circuit 34, the focus servo operation can be started immediately without correcting any spherical aberration.

Furthermore, if the hologram element 17 without the second area 41 by setting α=β (=$r_0$) is used, signal amplitude deterioration can be reduced by using the first defocus detection signal FES1 or the third defocus detection signal FES3 generated by the first ray U1 and the third ray U3 separated by the first area 40 and the third area 42.

Figure 7:
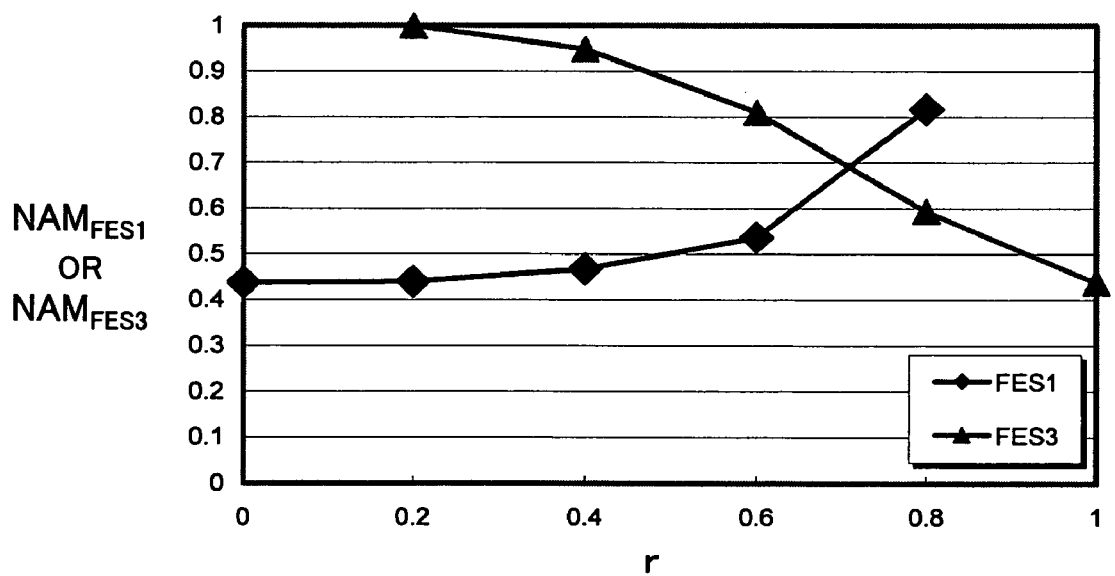
FIG. 7 is a diagram showing variations in amplitude of two defocus detection signals detected when the division pattern of the hologram element of the optical head device according to the first embodiment is specified as $\alpha=\beta$.

FIG. 7 is a diagram showing variations in amplitude of the two defocus detection signals detected when the division pattern of the hologram element of the optical head device 201 according to the first embodiment is specified as $r_0$=α=β. In FIG. 7, the horizontal axis represents a normalized radius 'r' of the hologram element 17, and the vertical axis represents normalized signal amplitude $NAM_{FES1}$ or $NAM_{FES3}$ of the defocus detection signals FES1 and FES3. In other words, FIG. 7 is a diagram showing variations in signal amplitude $NAM_{FES1}$ or $NAM_{FES3}$ of the first defocus detection signal FES1 or the third defocus detection signal FES3 when the normalized radius 'r' (when $r_0$=α=β) is increased. In this example, the magnitude of the spherical aberration is set as $W_{SA}$=5.787λ, for example. In comparison with the conventional defocus detection signal FES (FIG. 4), the amplitude deterioration of the first defocus detection signal FES1 is reduced as a value 'r' decreases. When a value 'r' is less than 0.7, for example, an improvement of 20% or greater can be expected with reference to the signal amplitude without spherical aberration. As for the third defocus detection signal FES3, an improvement of 20% or greater can be expected when a value 'r' is more than 0.7.

Accordingly, if a value 'r' is optimized, amplitude deterioration caused by a great spherical aberration can be suppressed more by using the first defocus detection signal FES1 or the third defocus detection signal FES3 than by using the conventional astigmatic defocus detection signal FES, and the judgment of the optical disk and the counting of recording layers can be carried out without an error.

Figure 8:
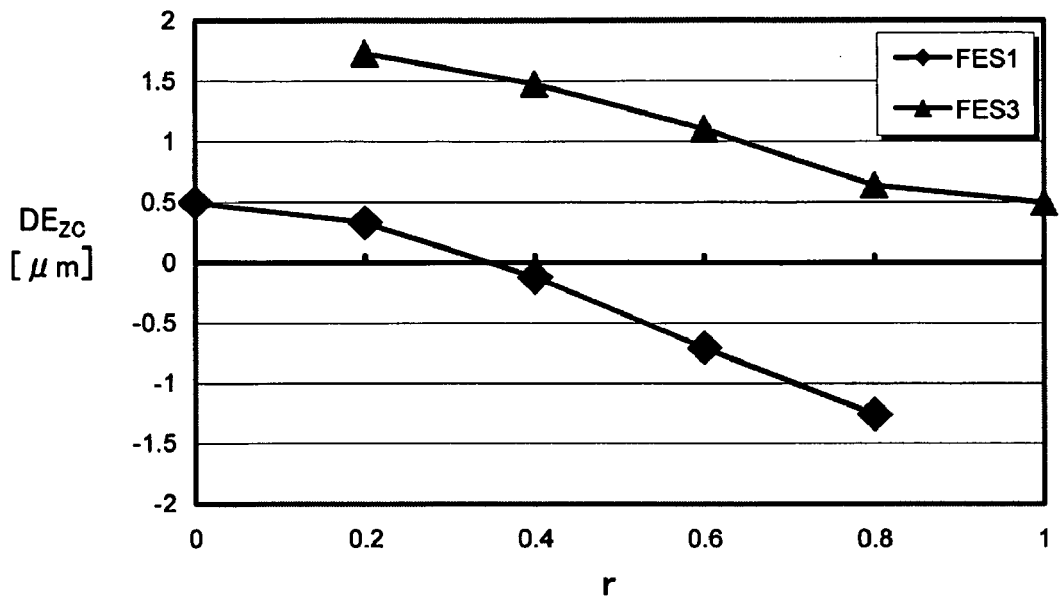
FIG. 8 is a diagram showing variations in the amount of deviation of the zero-crossing points of the two defocus detection signals detected when the division pattern of the hologram element of the optical head device according to the first embodiment is specified as $\alpha=\beta$.

FIG. 8 is a diagram showing variations in the amount of deviation of the zero-crossing points of the defocus detection signals FES1 and FES3 with reference to the horizontal axis of the signal amplitude characteristics shown in FIG. 7. In FIG. 7, the horizontal axis represents a normalized radius 'r' of the hologram element 17, and the vertical axis represents the amount of deviation $DE_{ZC}$ (μm) in the zero-crossing point of the defocus detection signals FES1 and FES3. The amount of deviation $DE_{ZC}$ in the zero-crossing point is the distance from the position where the most of the light beam is converged onto the optical disk 14 by the objective lens group 13 when the magnitude of spherical aberration $W_{SA}$ is 0. This represents defocusing on the optical disk 14 when the focus servo operation is performed by using the zero-crossing point as the servo operating point. Consequently, defocusing on the optical disk 14 can be suppressed by giving an electrical offset, for example, after the focus servo operation is performed by using the zero-crossing point as the servo operating point.

When the values of α and β of the hologram element 17 are determined as follows, the following effect can be obtained.

On the assumption that the third-order spherical aberration $W_{40}$ is most dominant in the spherical aberration caused by an error of substrate thickness of the optical disk 14 and a difference in layer-to-layer distance of the multilayer recording disk, the spherical aberration $W_{40}$ is generally expressed by an expression, in which the spherical aberration is proportional to the fourth power of a distance from the central optical axis of the light beam.

However, the quality of the light converging spot can be improved, by correcting the defocusing aberration component expressed as a quadratic function of 'r' through correcting the distance between the optical disk 14 and the objective lens group 13 or the like. Suppose that the aberration is given by Expression 10 below when the defocusing aberration component is corrected.

$$W_{40}(r) = W_{SA} \times (6r^4 - 6r^2 + 1) \tag{10}$$

Figure 9:
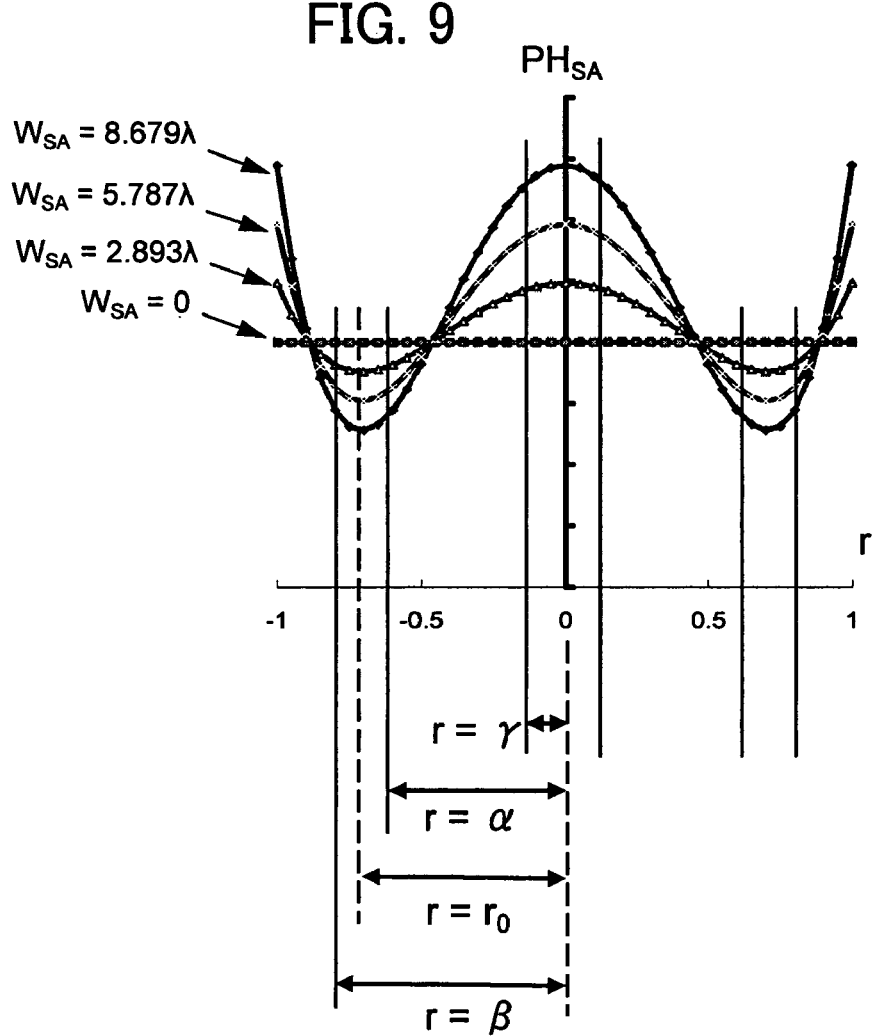
FIG. 9 is a diagram showing a phase distribution relative to the radius of the ray in the optical head device according to the first embodiment.

FIG. 9 is a diagram showing the distribution of phase $PH_{SA}$ of the spherical aberration on the vertical axis with respect to normalized radius 'r', which is a distance from the central optical axis of the light beam on the horizontal axis. The radius 'r' of the outermost edge of the light beam is set as r=1, and $W_{SA}$ is the amount of phase of the spherical aberration when r=1.

The distribution of phase of the spherical aberration given by Expression 10 appears as shown in FIG. 9. The correction of the distance between the optical disk 14 and the objective lens group 13 cannot eliminate the aberration completely but can optimize the quality of the light converging spot on the optical disk 14, optimizing the quality of the reproduction signal of recorded data read from the optical disk 14. Further, the improved quality of the light converging spot will be favorable to the recording performance.

The following Expression 11 is obtained by differentiating Expression 10 with respect to 'r'.

$$\frac{d}{dr}W_{40}(r) = W_{SA} \times (24r^3 - 12r) = W_{SA} \times 12r \times (2r^2 - 1) \tag{11}$$

The condition of bringing the left side of Expression 11 to zero is expressed by the following Expression 12.

$$\frac{d}{dr}W_{40}(r) = 0 \tag{12}$$

A condition satisfying Expression 12 is given by the following Expression 13.

$$r = 0, \pm \frac{1}{\sqrt{2}} \approx 0, \pm 0.7071 \tag{13}$$

Suppose that the intermediate radius $r_0$ of the second area 41 is nearly $1/\sqrt{2}$. The hologram element 17 has such a division pattern that a ray at or near the distance of $r=1/\sqrt{2}$ where the function expressing the phase distribution shown in FIG. 9 reaches an extreme value, i.e., the gradient of the tangent becomes 0, can be taken.

Figure 10:
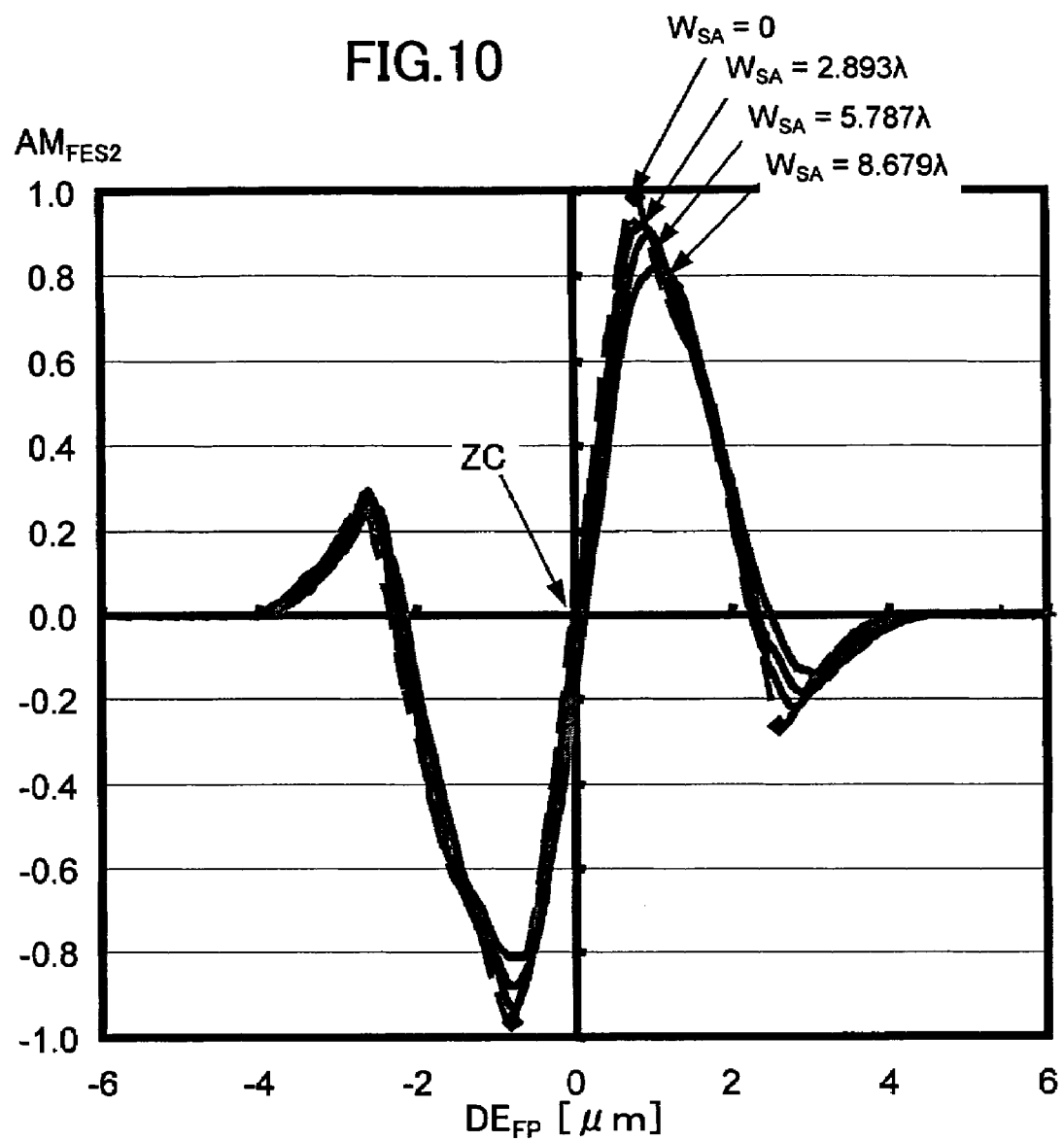
FIG. 10 is a diagram showing waveforms of the defocus detection signal detected by the optical head device according to the first embodiment by using an annular ray (in a case where the division pattern of the hologram element is set as $\alpha=0.63$ and $\beta=0.73$)

FIG. 10 is a diagram showing calculated waveforms of the second defocus detection signal FES2 when α=0.63 and β=0.73. In FIG. 10, the horizontal axis represents the amount of defocusing $DE_{FP}$ (μm) on the optical disk. The zero point indicates that the focus position is on the information recording surface of the optical disk; a point to the right of the zero point (positive side) indicates that the focus position is closer than the information recording surface of the optical disk; and a point to the left of the zero point (negative side) indicates that the focus position is further than the information recording surface of the optical disk. Further, in FIG. 10, the vertical axis represents normalized signal amplitude $NAM_{FES2}$ of the defocus detection signal FES2, and a point where $AM_{FES2}=0$ is a zero-crossing point ZC. In the waveform of the defocus detection signal shown in FIG. 5 and FIG. 6, the zero-crossing point where the signal level becomes zero between the peak and the valley of the waveform moves in the positive or negative direction, depending on the magnitude of the spherical aberration. In FIG. 10, however, the position of the zero-crossing point ZC of the waveform of the defocus detection signal does not vary with the magnitude of the spherical aberration.

The zero position on the horizontal axis (axis representing the defocusing amount. $DE_{FP}$ on the optical disk) in FIG. 5, FIG. 6, and FIG. 10 indicates the position where the most of the light beam is converged onto the optical disk 14 by the objective lens group 13. Therefore, it is preferable that the zero-crossing point ZC matches the zero position on the horizontal axis, in the same manner as the waveform shown in FIG. 10. In that case, the light beam can be satisfactorily converged onto the optical disk 14 just by performing the focus servo operation by using the zero-crossing point ZC as the servo operating point.

If the zero-crossing point is deviated from the zero position on the horizontal axis, as shown in FIG. 5 and FIG. 6, the compensation can be made by adjusting the servo operating point to the best position by giving an electric offset by the focus servo circuit or the like. However, if the zero-crossing point is greatly shifted to move the position of zero defocusing beyond the peak and valley of the defocus detection signal, the compensation cannot be made by giving an electric offset as described above.

The effect of preventing the movement of the zero-crossing point can be obtained because the effect of the spherical aberration on defocus detection can be suppressed by using an area around where $r=1/\sqrt{2}$, which has the least change in phase with respect to 'r', of the ray having the phase distribution of spherical aberration as shown in FIG. 9.

If the focus servo operation is performed by using the second defocus detection signal FES2 as a control signal of the two-dimensional actuator 15 as shown in FIG. 10, the light converging spot of the highest quality corrected by the defocusing aberration given by the above-mentioned Expression 10 can be obtained even if the spherical aberration is not corrected (accordingly, even if the spherical aberration correction means is not provided) or even if the spherical aberration correction is not optimized.

Accordingly, if the light spot of the optimized quality can be obtained at the moment of focus servo operation to a certain recording layer of the optical disk, the recorded data can be reproduced or written when the spherical aberration correction is not necessarily optimized. In addition, the quality of a tracking error signal or a track traversing modulation signal obtained when the light converging spot crosses a track of the optical disk 14 can be maintained, and a seek operation in a radial direction DR of the optical disk 14 performed by sensing the number of track jum from the track traversing signal or the tracking error signal can become more stable.

Especially, this is also effective when a layer-to-layer jump is made from a layer to another certain layer while the multilayer recording disk is being reproduced or recorded, for example. If a track traversing modulation signal or a tracking error signal resistant to the seek can be obtained without sufficient spherical aberration correction before or after the layer-to-layer jump, a movement can be immediately made to a desired track. Spherical aberration correction can be made in the seek operation, and the recording or reproduction operation can be started immediately after the movement to the track, thereby improving the access performance.

Further, if the midpoint $r_0$ between $\alpha$ and $\beta$ is set to about $1/\sqrt{2}$, variations in the position of the zero-crossing point can be reduced. However, the same effect can be obtained even if the value is different from $1/\sqrt{2}$ to some extent.

Although the waveforms shown in FIG. 5 and FIG. 6 are obtained when the width $|\beta-\alpha|$ of the second area 41 of the hologram element 17 is set to 0.1, the width $|\beta-\alpha|$ of the second area 41 may be a value other than 0.1.

Further, if the width $|\beta-\alpha|$ can be increased, a correspondingly greater light amount can be used for signal generation. Accordingly, the second defocus detection signal FES2 can be made less prone to an offset or noise of an electric circuit.

In addition, the wider second area 41 makes it easier to fabricate the division pattern of the hologram element 17.

Figure 11:
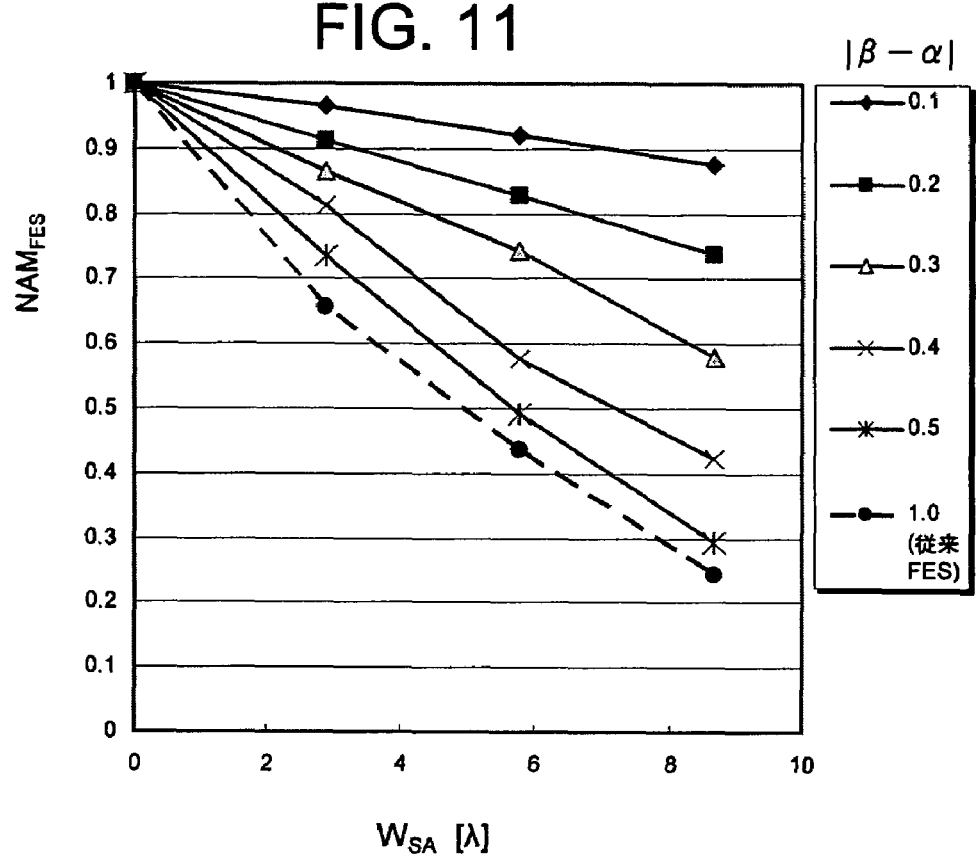
FIG. 11 is a characteristic diagram showing the dependency of the width of a second area of the hologram element with respect to variations in amplitude due to spherical aberration of defocus detection signal FES2 of the optical head device according to the first embodiment.

FIG. 11 is a diagram showing calculated variations in amplitude of the second defocus detection signal FES2 with respect to the width $|\beta-\alpha|$ of the second area 41. In FIG. 11, the horizontal axis represents a spherical aberration $W_{SA}$ ($\lambda$), and the vertical axis represents normalized signal amplitude $NAM_{FES2}$ of the defocus detection signal FES2. A broken line connecting black circles in FIG. 11 (a case where $|\beta-\alpha|$ is 1.0) corresponds to normalized signal amplitude of the conventional defocus detection signal FES. The shown example is calculated on the condition that the intermediate radius $r_0$ of the second area 41 is 0.68 and the deviation of the zero-crossing point almost satisfying Expression 12 is small. FIG. 11 indicates that an increase in $|\beta-\alpha|$ increases the amplitude deterioration of the defocus detection signal even when the spherical aberration of the same magnitude exists, but the amplitude deterioration is improved in comparison with the conventional detection method, which is represented by a broken line.

Figure 12:
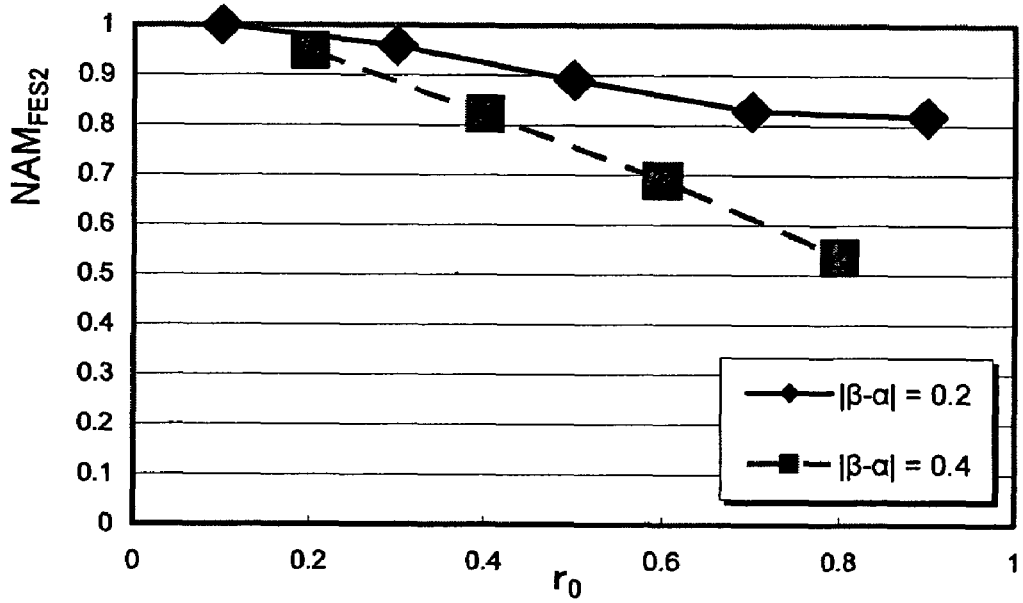
FIG. 12 is a diagram showing variations in amplitude of a second defocus detection signal with respect to the intermediate radius of the second area of the hologram element of the optical head device according to the first embodiment.

FIG. 12 is a diagram showing variations in amplitude of the second defocus detection signal when $r_0$ is increased from inside toward outside when $|\beta-\alpha|$ is 0.2 or 0.4. In FIG. 12, the horizontal axis represents the intermediate radius $r_0$, and the vertical axis represents the normalized signal amplitude $NAM_{FES2}$ of the defocus detection signal FES2. In the shown example, the magnitude of the spherical aberration is set as $W_{SA}=5.787\lambda$, for example. As can be understood from FIG. 12, a decrease in $r_0$ (the second area 41 is reduced toward the inside) decreases the signal amplitude deterioration caused by the spherical aberration. In comparison with the conventional detection method, the signal amplitude deterioration can be improved, irrespective of $r_0$. As $|\beta-\alpha|$ decreases, the signal amplitude deterioration is reduced. Therefore, the amplitude deterioration can be suppressed, in comparison with the conventional detection method.

Figure 13:
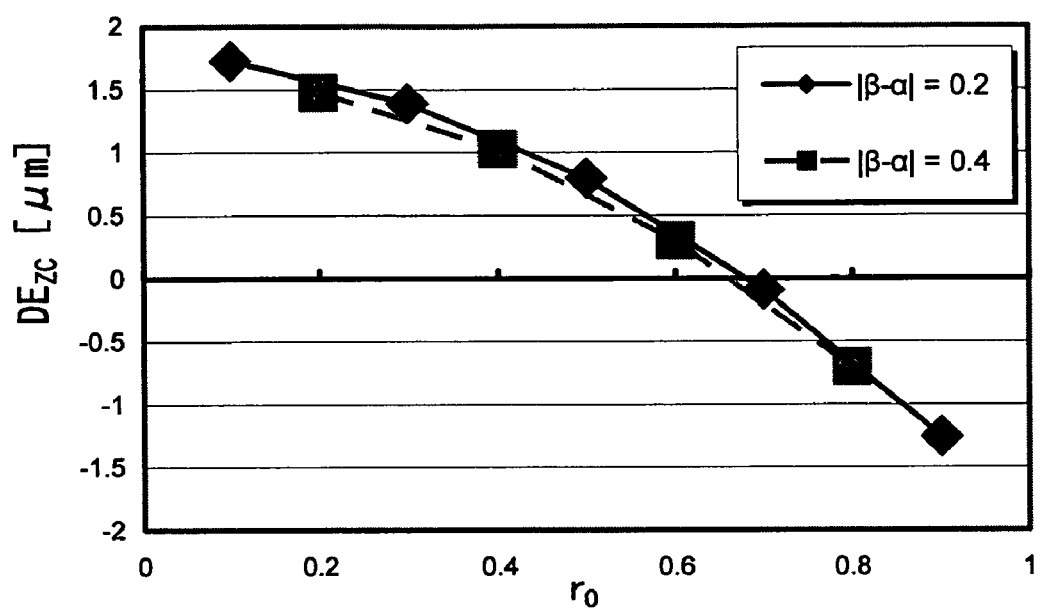
FIG. 13 is a diagram showing variations in the amount of deviation of the zero-crossing point of the second defocus detection signal with respect to the intermediate radius of the second area of the hologram element of the optical head device according to the first embodiment.

FIG. 13 is a diagram showing the amount of deviation in the zero-crossing point of the defocus detection signal with respect to the horizontal axis of the signal amplitude characteristics shown in FIG. 12. In FIG. 13, the horizontal axis represents the intermediate radius $r_0$, and the vertical axis represents the amount of deviation $DE_{ZC}$ (µm) in the zero-crossing point of the defocus detection signal FES2. The vertical axis indicates the distance from the position where the most of the light beam is converged onto the optical disk 14 by the objective lens group 13 when the magnitude of the spherical aberration is set as $W_{SA}=0$. In any case where $|\beta-\alpha|$ is 0.2 or where $|\beta-\alpha|$ is 0.4, the amount of deviation varies with respect to $r_0$ in the same manner, and crosses the horizontal axis around the position of $r=1/\sqrt{2}$ obtained from Expression 13, where the amount of deviation in the zero-crossing point reaches 0. The variations shown in FIG. 13 have similar tendency (not shown) when $|\beta-\alpha|$ is in different condition or when the magnitude of the spherical aberration is in different condition.

Accordingly, by specifying the intermediate radius $r_0$ of the second area 41 around the intersection point of the horizontal axis shown in FIG. 13, or by specifying such a division pattern of the hologram element 17 that the ray near the intersection point can be taken, the amplitude deterioration of the defocus detection signal because of spherical aberration can be reduced, and the second defocus detection signal FES2 can be obtained with a small deviation in the zero-crossing point.

$\alpha$ and $\beta$ of the hologram element 17 should be optimized in accordance with the magnitude of the spherical aberration that is assumed to exist in the optical disk apparatus 301 including the optical head device 201 according to the first embodiment and allowable amount of signal amplitude deterioration of the defocus detection signal in the entire system of the optical disk apparatus 301.

Incidentally, the intersection point where the amount of deviation in the zero-crossing point disappears in FIG. 13 is a little smaller than the position of $1/\sqrt{2}$ ($\approx$0.7071) derived from Expression 13. The position of the intersection point will become smaller as the width $|\beta-\alpha|$ of the second area 41 increases.

Accordingly, it is more preferable that the intermediate radius $r_0$ is shifted in accordance with the width $|\beta-\alpha|$ of the second area 41. Then, the amount of deviation in the zero-crossing point can be brought more accurately closer to zero. The way of specifying the optimized $\alpha$ and $\beta$ will be described later.

In the way of specifying the optimized $\alpha$ and $\beta$, $\alpha$ and $\beta$ are specified so that values of phase distribution as shown in FIG. 9 match at $r=\alpha$ and $r=\beta$. In other words, $\alpha$ and $\beta$ that satisfy Expression 14 below are specified. As the specified $\alpha$ and $\beta$ can be brought closer to the values obtained in the method, optimum intermediate radius $r_0$ for the width $|\beta-\alpha|$ of the second area 41 can be specified.

$$W_{40}(\alpha)=W_{40}(\beta) \qquad (14)$$

Therefore, $\beta$ which satisfies Expression 14 is obtained by Expression 15 below:

$$\beta = 0, \pm\sqrt{1-\alpha^2} \quad (15)$$

Accordingly, intermediate radius $r_0$ of the second area 41 can be given by Expression 16 below with respect to α.

$$r_0 = \frac{(\alpha+\beta)}{2} = \frac{\alpha+\sqrt{1-\alpha^2}}{2} \quad (16)$$

If $|\beta-\alpha|$ is 0.2, Expression 15 and Expression 16 give the following:

α=0.600

β=0.800

$r_0$=0.700.

So, $r_0$ is shifted to the inside by about 0.0071 from $1/\sqrt{2}$ (≈0.7071) in Expression 13.

Further, when $|\beta-\alpha|$ is 0.4, for example, Expression 15 and Expression 16 give the following:

α=0.480

β=0.877

$r_0$=0.679.

Accordingly, $r_0$ is shifted toward the inside by about 0.029 from $1/\sqrt{2}$ (≈0.7071).

These values match the calculated values in FIG. 13. Therefore, a deviation in the zero-crossing point can be suppressed by determining the division pattern of the hologram element 17 as given by Expression 15 and Expression 16.

Furthermore, the hologram element 17 having the division pattern shown in FIG. 2 divides the light beam to two annular rays (the second ray U2 and the third ray U3) and one circular ray (the first ray U1), but the division pattern may have more divided areas in the radial direction. In that case, the number of the photoreceptors in the photodetector 19 must be increased in accordance with the number of the divided areas in the radial direction of the light beam. If an inside ray having a smaller ray radius and an annular ray of which intermediate radius is about $r=1/\sqrt{2}$ given by Expression 13 are used, a greater light amount of less amplitude deterioration can be used for generating a signal by utilizing a combination of the corresponding detected defocus detection signals. A defocus detection signal having a small influence on the circuit offset and circuit noise can be obtained accordingly.

Figure 14A:
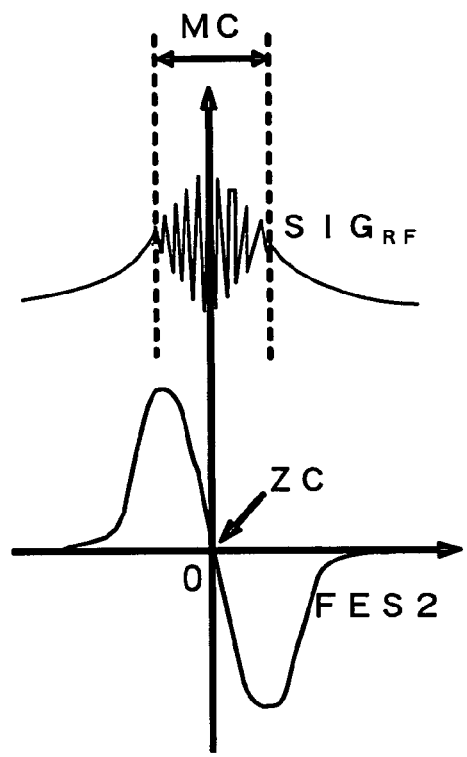
FIG. 14A is a diagram showing a range including the modulation component of the RF reproduction signal under ideal conditions and showing that the zero-crossing point of the second defocus detection signal appears where the modulation component is almost maximum.
Figure 14B:
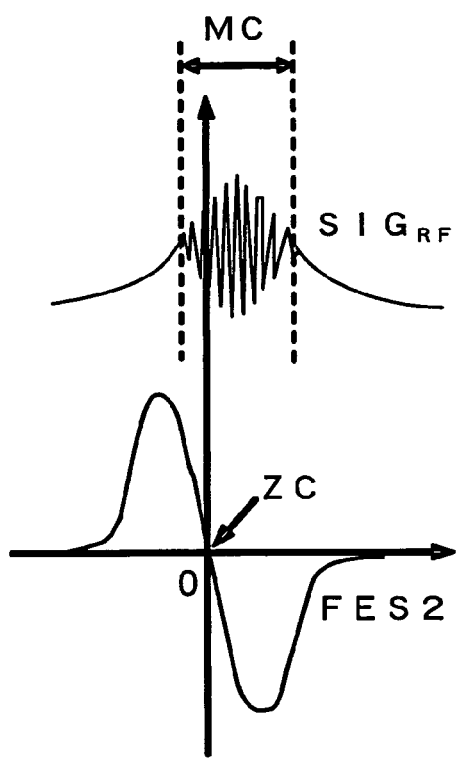
FIG. 14B is a diagram showing the positional relationship between the modulation component of the RF reproduction signal and the zero-crossing point when the zero-crossing point of the second defocus detection signal moves, depending on a sign relationship of whether the signs of the third-order spherical aberration coefficient and the fifth-order spherical aberration coefficient coincide or not.

Under a so-called ideal condition, where the optical system is assumed to have only a third-order spherical aberration, the greatest effect can be obtained by specifying the intermediate radius of the second area 41 as around $r=1/\sqrt{2}$, as described above. Under the ideal condition, the zero-crossing point of the second defocus detection signal FES2 is around the nearly greatest modulation component of the RF reproduction signal, as shown in FIG. 14A. In FIGS. 14A and 14B, SIG$_{RF}$ represents the RF reproduction signal, MC represents the modulation component of the RF reproduction signal, and ZC represents the zero-crossing point. It is preferable that intermediate radius 'r' be specified so that the greatest modulation component of the RF reproduction signal SIG$_{RF}$ is positioned between the positions of the greatest peak and the smallest peak of the second defocus detection signal FES2. In the actual optical system, however, the ideal condition is not necessarily obtained because of the following factors.

A first factor is a high-order spherical aberration that cannot be ignored and is other than the greatest third-order spherical aberration. The surface shapes of the lenses of the objective lens group 13 are designed to form spots necessary for recording and reproducing information on the optical disk. Spherical aberration caused by a difference in thickness of the transparent substrate of the optical disk varies with design specifications and design techniques, and a high-order spherical aberration may be generated in some cases. Further, the objective lens group 13 has been described as a combination of a plurality of lenses, but this may be configured by a single lens.

If the high-order spherical aberrations are simultaneously generated, the zero-crossing point of the second defocus detection signal FES2 is shifted by specifying the intermediate radius of the second area 41 as $r=1/\sqrt{2}$, as given by Expression 13 obtained by assuming the third-order spherical aberration. If the high-order spherical aberrations include a fifth-order spherical aberration, the fifth-order spherical aberration is the sum of the fifth-order spherical aberration generally expressed as a sixth-order equation with respect to the radius 'r' and a third-order spherical aberration expressed by Expression 13. Now, the sixth-order coefficient of the fifth-order spherical aberration is expressed as $W_{SA5}$. The zero-crossing point of the second defocus detection signal FES2 moves to the left or right in FIG. 10, depending on the sign relationship, or whether coefficient $W_{SA}$ of the third-order spherical aberration and fifth-order spherical aberration $W_{SA5}$ have the same sign or not. The positions of the modulation component MC and the zero-crossing point ZC of the RF reproduction signal moves as shown in FIG. 14B, for example.

A second factor is that when there is spherical aberration, the defocusing aberration component to be corrected to modulate most the light beam reflected by the optical disk 14 is affected by the spatial frequency of the recording surface structure of the optical disk 14, the intensity distribution of the light beam 2 input to the objective lens group 13, and the like.

Data about the effect of the spatial frequency are disclosed in Non-Patent Document 2 (FIG. A.6 on page 341), for example. FIG. A.6 of Non-Patent Document 2 shows the best defocusing amount with which most modulation occurs at each spatial frequency when there is a certain spherical aberration. According to FIG. A.6 of Non-Patent Document 2, relatively great modulation occurs when the best defocusing amount (best focus) B* is within the range of about 0.4 to 1.4. As the spherical aberration value increases, the lower limit of the range decreases below 0.4. The lower limit of the best defocusing amount B* varies as if it gradually approaches a certain value. The spherical aberration expressed by Expression 10 corresponds to the expression of spherical aberration when the best defocusing amount B* is 1.

Accordingly, if the best defocusing amount B* departs from 1, depending on the spatial frequency component included in the recording surface structure of the optical disk 14, the zero-crossing point of the second defocus detection signal FES2 obtained when the intermediate radius of the second area 41 is specified as $r=1/\sqrt{2}$ in Expression 13 moves to the left or right in FIG. 10. The positional relationship between the modulation component and the zero-crossing point of the RF reproduction signal moves as shown in FIG. 14B, as with the first factor.

The movement of the zero-crossing point of the second defocus detection signal FES2 caused by the first factor and the second factor described above can be corrected by shifting the intermediate radius of the second area 41 from $r=1/\sqrt{2}$ in Expression 13 obtained by assuming the third-order spherical aberration. In other words, as can be understood from the calculated results shown in FIG. 5 and FIG. 6, the zero-crossing point of the second defocus detection signal FES2 can be moved as desired by increasing or decreasing the intermediate radius of the second area 41.

Accordingly, the zero-crossing point can be corrected by shifting the radius from $r=1/\sqrt{2}$, so that the position of the modulation component of the RF reproduction signal obtained by Expression 9 or the sum signal of light receiving surfaces P1, P2, and P3 detected by the first, second, and third rays U1, U2, and U3 split by the hologram element 17, depending on the recording surface of the optical disk 14, almost agrees with the zero-crossing point.

If the position where the modulation component of the RF reproduction signal or the sum signal of diffracted light beams split by the hologram element 17 is maximized is corrected to match the position of the zero-crossing point through the correction as described above, the light beam on the optical disk when the focus servo operation is performed by using the zero-crossing point as the servo operating point can be brought closer to a good light collection state. In addition, if a correction is made to bring the position of the highest modulation component between the positions of the greatest peak and the smallest peak of the second defocus detection signal FES2 at least in all layers of the optical disk 14, the modulation component of the RF reproduction signal or the sum signal of diffracted light beams split by the hologram element 17 can be maximized by inserting an appropriate electrical offset before or after the focus servo operation.

The method of detecting spherical aberration will next be described. In the description, the hologram element 17 includes three areas including a first area 40, a second area 41, and a third area 42. FIG. 15A shows waveforms of the RF signal output from the reproduction signal detection circuit 33 and the second defocus detection signal FES2 of the defocus detection signal circuit 30. FIG. 15B shows waveforms of the first defocus detection signal FES1 and the third defocus detection signal FES3 output from the defocus detection signal circuit 30, and both of the shown waveforms are observed when spherical aberration is present.

Figure 16:
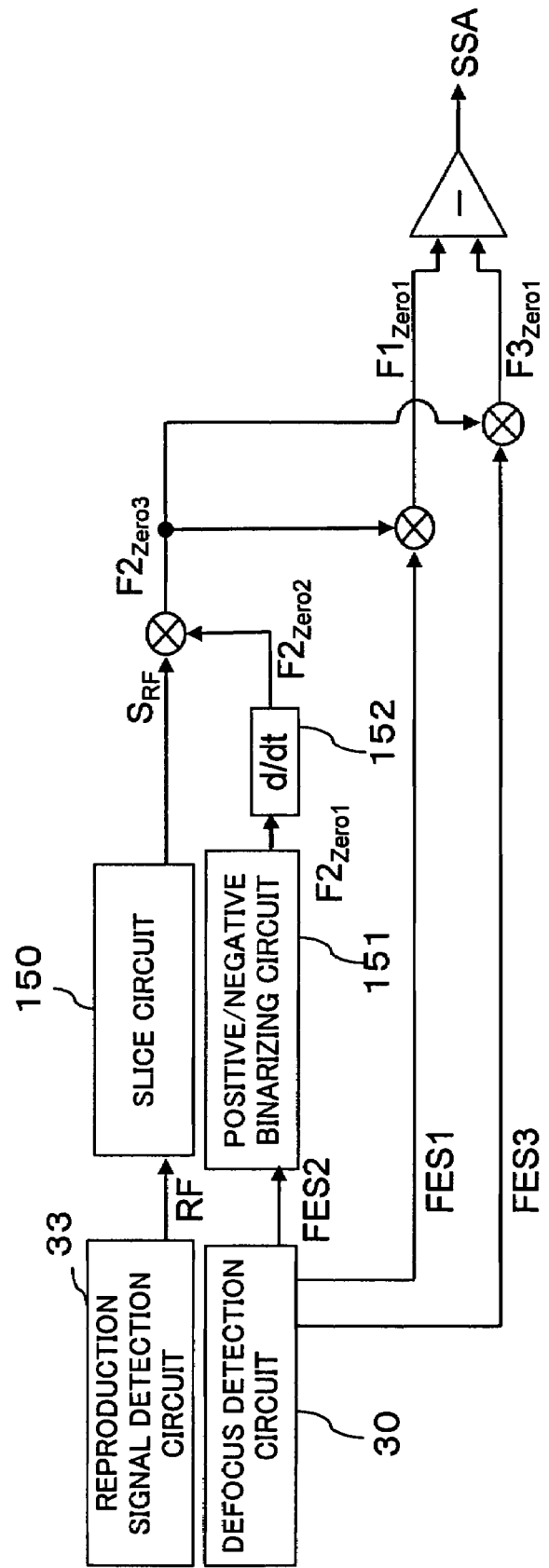
FIG. 16 is a block diagram showing a configuration of a spherical aberration detection circuit in the optical head device according to the first embodiment.

These waveforms are obtained when the semiconductor laser 1 emits a laser beam and the two-dimensional actuator 15 drives the objective lens group 13 in the direction of the optical axis (z-axis direction) to scan a light converging spot formed by the objective lens group 13 on a recording layer of the optical disk 14. FIG. 16 is a block diagram showing a configuration of the spherical aberration detection circuit 32.

The RF signal is converted to a rectangular signal $S_{RF}$ as shown in FIG. 15C by a threshold voltage appropriately specified by the slice circuit 150.

Of the first, second, and third defocus detection signals FES1, FES2, and FES3 output from the defocus detection circuit 30, the second defocus detection signal FES2 is converted to a waveform $F2_{Zero1}$ by a positive/negative binarizing circuit 151 for converting a positive portion of the waveform to a high level and a negative portion to a low level. Then, a differentiating circuit (d/dt) 152 converts the waveform $F2_{Zero1}$ to an edge-detected rectangular waveform $F2_{Zero2}$.

By multiplying the waveform $F2_{Zero2}$ by the rectangular signal $S_{RF}$, a rectangular waveform $F2_{Zero3}$, which represents just the position of the zero-crossing point of the second defocus detection signal FES2, is obtained. From the rectangular waveform $F1_{Zero}$ and the rectangular waveform $F3_{Zero}$ obtained by multiplying the rectangular waveform $F2_{Zero3}$ by the first defocus detection signal FES1 and by the third defocus detection signal FES3, a spherical aberration detection signal SSA is calculated, as expressed by Expression 17.

$$SSA = F1_{Zero} - F3_{Zero} \tag{17}$$

A spherical aberration correction means is used to control spherical aberration correction based on the level of the spherical aberration detection signal SSA and is controlled so that the level becomes zero. In other words, the spherical aberration correction means is controlled to bring the detection level to zero by detecting the output levels of the defocus detection signals (FES1 and FES3, here) at the zero-crossing point of any (here FES2) of the first, second, and third defocus detection signals FES1, FES2, and FES3.

In addition, the spherical aberration correction means can be controlled from the level of the spherical aberration detection signal SSA obtained in advance in accordance with the conversion coefficient or conversion table to the control amount of the spherical aberration correction means. This enables spherical aberration detection and spherical aberration correction to be carried out before the focus servo operation, and the time needed before the start of the recording or reproducing operation can be reduced.

Further, the spherical aberration detection and spherical aberration correction can also be carried out as follows. First, the focus servo operation is conducted in accordance with the second defocus detection signal FES2. If the servo operating point is near the zero-crossing point of the second defocus detection signal FES2 when spherical aberration is present, the levels of the first defocus detection signal FES1 and the third defocus detection signal FES3 will not be zero. The signal levels of the first defocus detection signal FES1 and the third defocus detection signal FES3 or a difference between the first defocus detection signal FES1 and the third defocus detection signal FES3 may be used as a spherical aberration detection signal, and the spherical aberration correction means can be controlled so that the level of the spherical aberration detection signal becomes zero.

Furthermore, in Patent Document 2 (Japanese Patent Application Publication No. 2002-367197), the ray is controlled in a radial direction to detect spherical aberration under such condition that two split rays have the same light amount, which fundamentally differs from the ray splitting method according to the first embodiment of the present invention. In Patent Document 2, a defocus detection signal detected in the total ray is used as a signal for controlling the position of the objective lens group in a direction of the optical axis (z-axis direction), so that the effect obtained by the first embodiment of the present invention cannot be obtained.

Moreover, the first embodiment of the present invention has been described as an optical configuration utilizing an astigmatic defocus detection method. In any defocus detection method based on the converged ray, the image formation positions of rays having different radii basically cancel out each other when there is a phase distribution as shown in FIG. 9, and the defocus detection signal deteriorates in the same manner.

Accordingly, the first embodiment may be configured to make detection by a knife edge method or a beam size method, and then the sensor optical element 18 does not need to have astigmatism. Since the tangential direction and the radial direction DR will not be replaced each other on a photodetector by the effect of astigmatism, the direction in which a difference is taken in the calculation equation of tracking error detection should be specified as the x direction in FIG. 3. A lens function can be added by curving the diffraction grating in each area of the division pattern of the hologram element 17, and in this case, the sensor optical element 18 can be eliminated.

Figure 17:
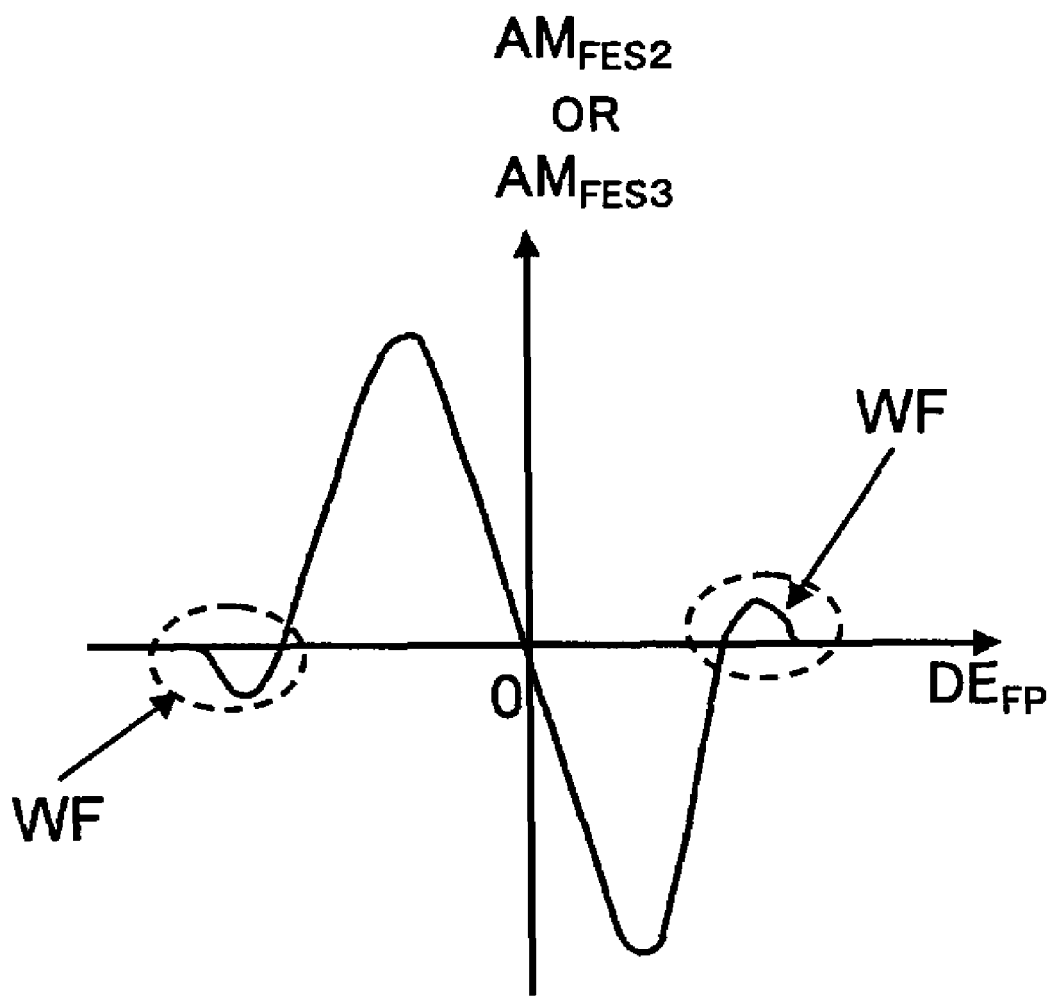
FIG. 17 is a schematic diagram showing the waveform of a second defocus detection signal or a third defocus detection signal of the optical head device according to the first embodiment.

FIG. 17 is a schematic diagram showing a waveform of the second defocus detection signal FES2 or the third defocus detection signal FES3 in the optical head device 201 according to the first embodiment. In FIG. 17, the horizontal axis represents the defocusing amount $DE_{FP}$ on the optical disk, and the vertical axis represents amplitude $AM_{FES3}$ of the defocus detection signal. FIG. 17 shows the characteristics of the calculated waveforms shown in FIG. 5, FIG. 6, and FIG. 10, and the calculated waveform has second-order waveforms WF at both ends of the defocus detection signal. These second-order waveforms are unnecessary for defocus detection, and if the amplitude of the second-order waveforms becomes too high, the focus servo operation may start accidentally.

Figure 18C:
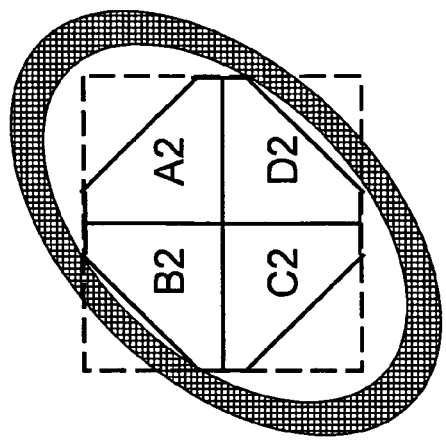
FIGS. 18A to 18C are schematic plan views showing an annular ray on the photodetector of the optical head device, a light-receiving area pattern, and an improved light-receiving area pattern according to the first embodiment.
Figure 18B:
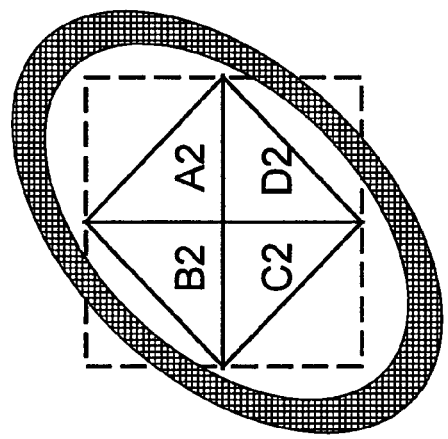
Figure 18A:
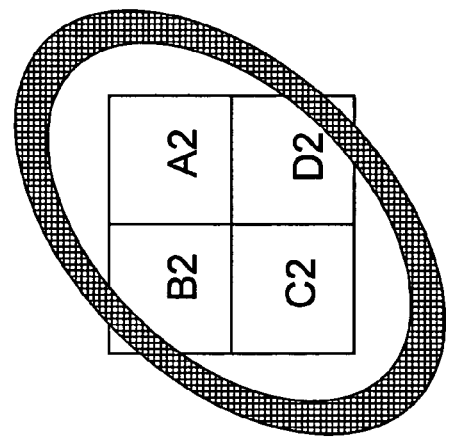

The cause of the second-order waveform is that an annular ray split by the second area 41 and the third area 42 in FIG. 2 are hardly applied to the light receiving area A2 and the light receiving area C2 and are applied to the light receiving area B2 and the light receiving area D2, as shown in FIG. 18A. Conversely, the ray may be hardly applied to the light receiving area B2 and the light receiving area D2 and be applied to the light receiving area A2 and the light receiving area C2. FIG. 18A shows a state of the second photoreceptor P2, and the same phenomenon will occur on the third photoreceptor P3. The state described above can be avoided by cutting off or splitting a corner of each light receiving area as shown in FIG. 18B or FIG. 18C. By doing this, the second-order waveform can be prevented from being generated.

Figure 19:
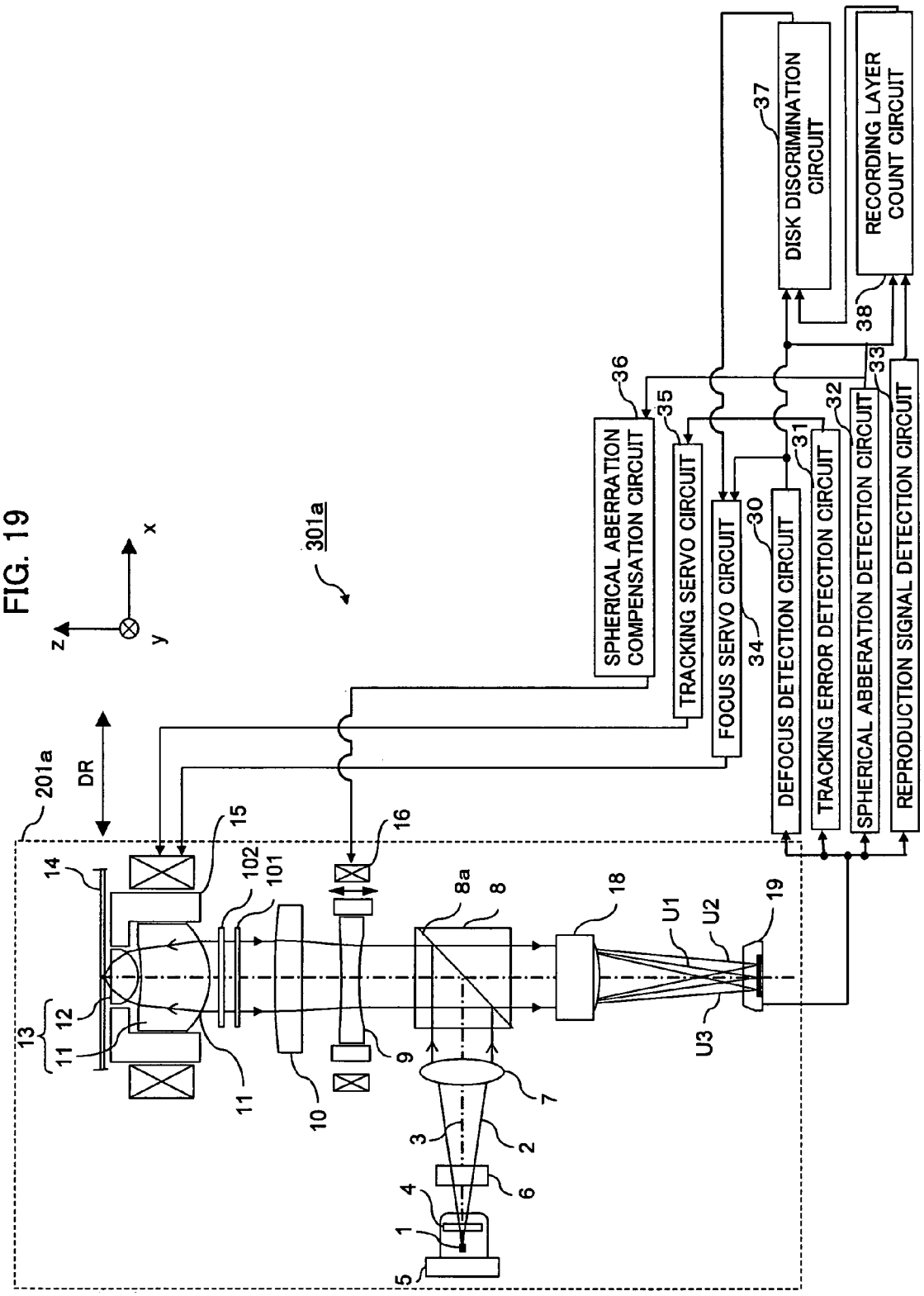
FIG. 19 is a diagram showing a basic configuration of a modified example of the optical head device and optical disk apparatus according to the first embodiment of the present invention.

FIG. 19 is a diagram showing a basic configuration of an optical head device 201 and an optical disk apparatus 301a of a modified example according to the first embodiment of the present invention. In FIG. 19, components that are the same as or correspond to components in FIG. 1 are denoted by the same reference characters. In FIG. 19, a hologram element 101 having the same division pattern as the hologram element 17 shown in FIG. 1 is disposed between the second lens 10 and the third lens 11. In addition, the hologram element 101 is a polarizing hologram element that works only for the light beam reflected from the optical disk 14, and a quarter wavelength plate 102 is disposed between the hologram element 101 and the third lens 11. In this configuration, the deflection prism 8 may be a polarizing prism to improve the optical utilization efficiency. The hologram element 101 and the quarter wavelength plate 102 shown in FIG. 19 may be integrated. Moreover, the hologram element 101 and the quarter wavelength plate 102 shown in FIG. 19 may be provided on the two-dimensional actuator 14 together with the objective lens group 13. Except for the above-described respects, the modified example according to the first embodiment is the same as the configuration shown in FIG. 1.

As has been described above, the optical head device and the optical disk apparatus according to the first embodiment can prevent the amplitude deterioration of the defocus detection signal which is used to occur when spherical aberration exists in the conventional defocus detection method utilizing the total ray, so that a stable focus servo operation can be performed. In addition, a layer-to-layer focus jump or a radial seek can be correctly conducted without a gain readjustment of the servo circuit for performing the focus servo operation or with inadequate correction of spherical aberration, so that the operating rate can be improved.

Further, amplitude deterioration of the defocus detection signal which is used to occur when spherical aberration exists in the conventional defocus detection method utilizing the total ray can be prevented, so that the number of recording layers of the optical disk and the type of the optical disk can be determined correctly.

Furthermore, amplitude deterioration of the defocus detection signal which is used to occur when spherical aberration exists in the conventional defocus detection method utilizing the total ray can be prevented, so that the number of the recording layers of the optical disk can be counted correctly.

Moreover, the amplitude of the defocus detection signal does not deteriorate even if a spherical aberration correction means for correcting spherical aberration in the beam reflected from the optical disk is not provided, so that the cost can be reduced.

Second Embodiment

Figure 20:
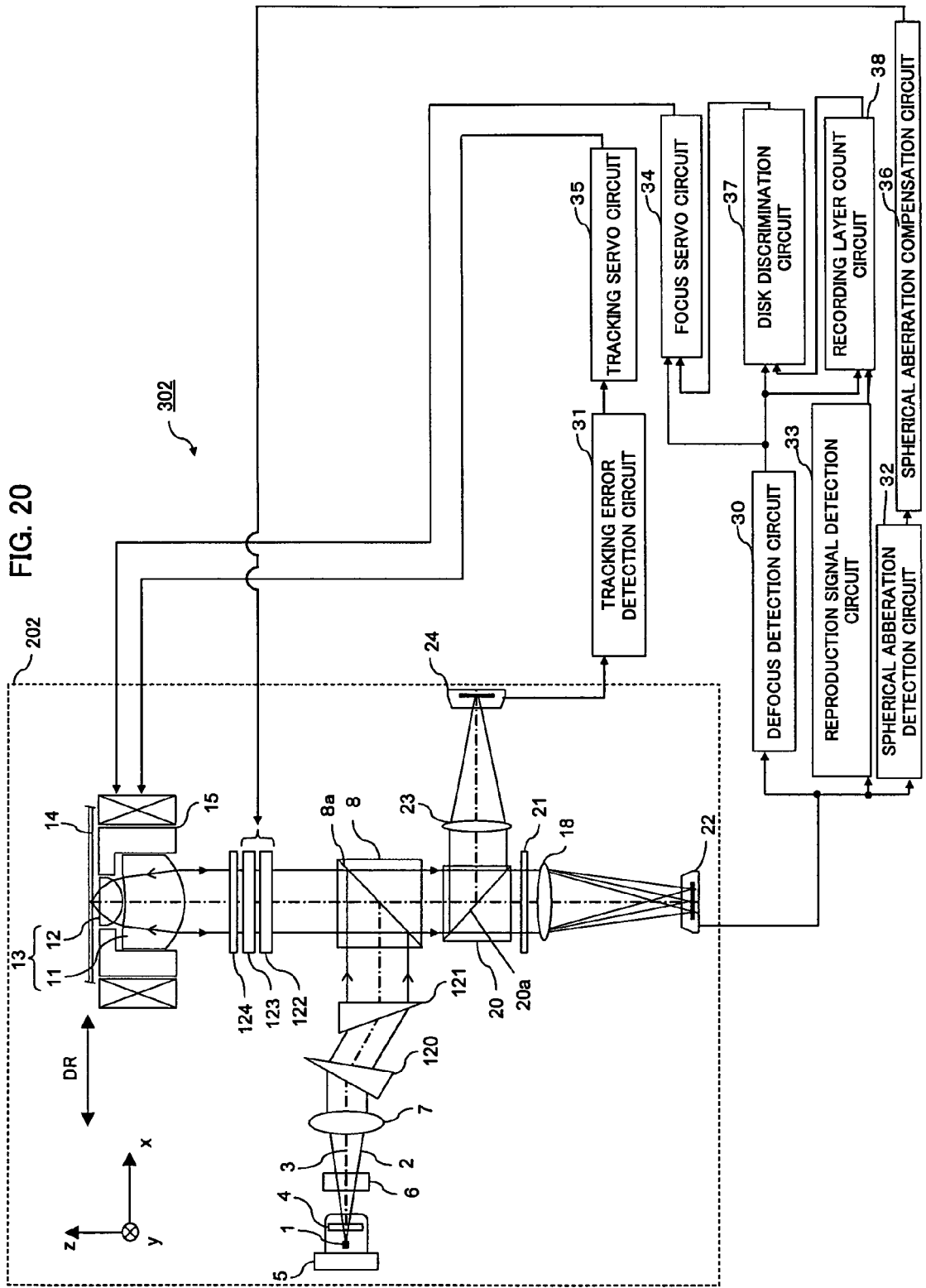
FIG. 20 is a diagram showing a basic configuration of an optical head device and an optical disk apparatus according to the second embodiment of the present invention.

FIG. 20 is a diagram showing a basic configuration of an optical head device 202 and an optical disk apparatus 302 according to the second embodiment of the present invention. In FIG. 20, components that are the same as or correspond to components shown in FIG. 1 are denoted by the same reference characters. The optical head device 202 according to the second embodiment differs from the optical head device for correcting spherical aberration by varying the distance between the first lens and the second lens according to the first embodiment (FIG. 1) in that a liquid-crystal phase corrector is used as a spherical aberration correction means. The liquid-crystal phase corrector according to the second embodiment has a liquid crystal sandwiched between glass substrates, transparent electrodes of which have a pattern of a plurality of divided areas in accordance with the shape of the wavefront. When a voltage is applied across the electrodes of the liquid-crystal phase corrector, spherical aberration is given to the light beam passing it.

The light beam 2 emitted from the semiconductor laser 1 is shared into a plurality of diffracted beams by the diffraction grating element 6, the collimator lens 7 changes the beams into parallel rays, and then the beam shaping prisms 120 and 121 convert the light beam 2 from an oval intensity distribution to a circular intensity distribution. Then, the light beam is deflected into the direction of the liquid-crystal phase corrector 122 by the deflection prism 8 and passes the liquid-crystal phase correctors 122 and 123. Then, the quarter wavelength plate 124 changes the light beam 2 to a circularly polarized light, and the objective lens group 13 collects the beam onto the optical disk 14.

The liquid-crystal phase correctors 122 and 123 have an appropriate electrode pattern for changing the phase of the passing light when a voltage is applied and enabling the correction of the spherical aberration. The light beam reflected by the optical disk 14 is circularly polarized light, but when the light passes the quarter wavelength plate 124 again, the polarizing direction of the incoming light beam entering the liquid-crystal phase corrector 122 is rotated by 90 degrees in the outgoing light beam.

Since a liquid crystal has a phase modulation effect on a predetermined polarizing direction alone, the liquid-crystal phase correctors 122 and 123 are disposed in such a manner that the liquid-crystal phase corrector 122 has a phase modulation effect on the incoming beam only and the liquid-crystal phase corrector 123 has a phase modulation effect on the outgoing beam only, with the optical axes of the phase modulation effect crossing at an angle of 90 degrees. With this configuration, a wavefront aberration of both the incoming light beam and the outgoing light beam can be corrected in the same manner as by the spherical aberration correction means shown in FIG. 1. Further, if the deflection prism 8 is a polarizing prism, the optical utilization efficiency can be improved.

The light beam passes the liquid-crystal phase corrector 123 and the deflection prism 8, and then the light beam is shared by the deflection prism 20. The light beam passing the deflection prism 20 straight is split and shared by the hologram element 21 and converged by the sensor optical element 18 onto the photodetector 22. On the other hand, a part of the light amount of the light beam is reflected by an internal reflecting surface 20a of the deflection prism 20 and is converged by a condenser lens 23 onto a photodetector 24. The photodetector 24 has a light-receiving area pattern with at least one separation boundary in both the tangential direction and the radial direction DR and allows push-pull tracking error detection or differential phase tracking detection.

In the second embodiment, the astigmatic defocus detection may be used in the same manner as the first embodiment shown in FIG. 1, but in the second embodiment described below, an example adopting the knife-edge defocus detection will be described.

Figure 21:
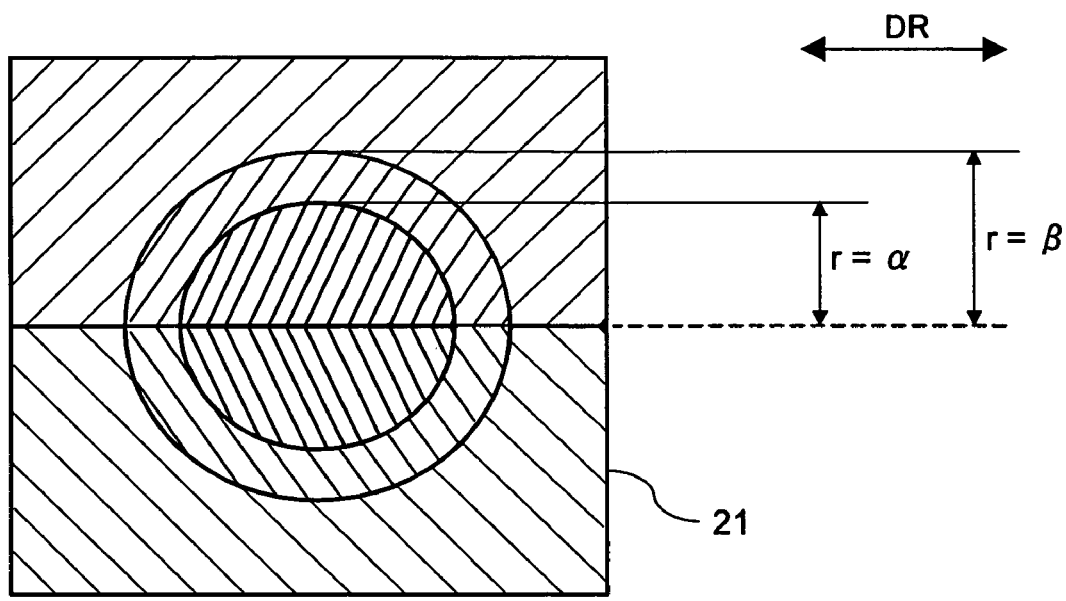
FIG. 21 is a schematic plan view showing a division pattern of a hologram element of the optical head device according to the second embodiment.

FIG. 21 is a schematic plan view showing a division pattern of the hologram element 21 of the optical head device 202 according to the second embodiment. The division pattern of the hologram element 21 shown in FIG. 21 differs from the hologram element 17 shown in FIG. 2 in that a separation boundary in a radial direction DR is added to form tangentially divided areas. The grating spacing, grating groove depth, and grating orientation of the diffraction grating in each area is optimized so that the rays split by the respective areas of the division pattern of the hologram element 21 shown in FIG. 21 can be separately received on the photodetector 22.

Figure 22:
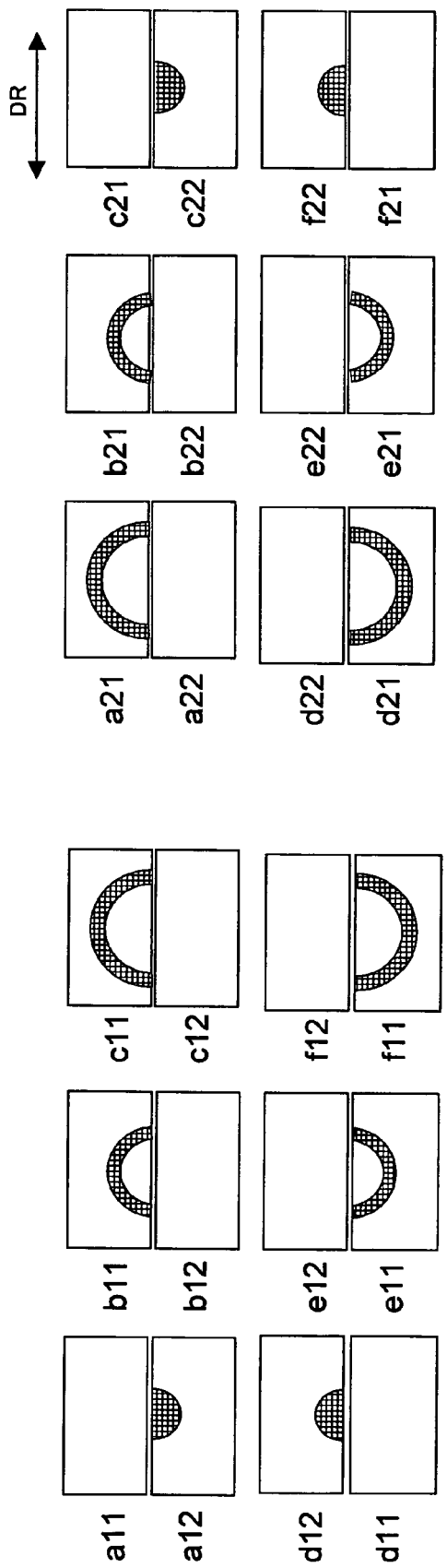
FIG. 22 is a schematic diagram showing a light-receiving area pattern of a photodetector of the optical head device according to the second embodiment and a ray on each photoreceptor.

FIG. 22 is a schematic diagram showing the light-receiving area pattern of the photodetector 22 in the optical head device 202 according to the second embodiment and the rays on the respective photoreceptors. As shown in FIG. 22, the photodetector 22 includes a plurality of photoreceptors including a two-division light receiving area (a pair of light receiving areas a11 and a12, a pair of light receiving areas b11 and b12, a pair of light receiving areas c11 and c12, a pair of light receiving areas d11 and d12, a pair of light receiving areas e11 and e12, a pair of light receiving areas f11 and f12, a pair of light receiving areas a21 and a22, a pair of light receiving areas b21 and b22, a pair of light receiving areas c21 and c22, a pair of light receiving areas d21 and d22, a pair of light receiving areas e21 and e22, and a pair of light receiving areas f21 and f22). The plurality of two-division light receiving areas of the photodetector 22 receives the corresponding split rays. A first-order diffracted light beam is mainly generated by the hologram element 21, and no high-order diffracted beams are shown in FIG. 22. Further, zero-order diffracted ray can be almost eliminated by optimizing the grating groove depth. In the description below, the characters a11, a12, b11, b12, c11, c12, d11, d12, e11, e12, f11, f12, a21, a22, b21, b22, c21, c22, d21, d22, e21, e22, f21, and f22 also denote values of the detection signals of the corresponding light receiving areas.

FIG. 22 schematically shows rays when spherical aberration is present. Knife-edge defocus detection signals detected from the rays can be obtained from Expression 18 to Expression 20 below:

$$FES1=(a11+d11+a21+d21)-(c12+f12+c22+f22) \quad \text{(Expression 18)}$$

$$FES2=(b11+e11+b21+e21)-(b12+e12+b22+e22) \quad \text{(Expression 19)}$$

$$FES3=(c11+f11+c21+f21)-(a12+d12+a22+d22) \quad \text{(Expression 20)}$$

Further, the conventional knife-edge defocus detection signal utilizing the total ray can be obtained from Expression 21 below:

$$FES=FES1+FES2+FES3 \quad \text{(Expression 21)}$$

Any of the defocus detection signals FES1, FES2, FES3, and FES is input to the focus servo circuit 34 as a control signal of the two-dimensional actuator 15.

Furthermore, a reproduction signal RF can be obtained by combining the output signals received with respect to all the rays, that is, by Expression 22 below:

$$RF=(a11+a12+a21+a22)+(b11+b12+b21+b22)+(c11+c12+c21+c22)+(d11+d12+d21+d22)+(e11+e12+e21+e22)+(f11+f12+f21+f22) \quad \text{(Expression 22)}$$

Moreover, a spherical aberration detection signal SSA can be obtained from the first defocus detection signal FES1 and the third defocus detection signal FES3 in the same manner as the embodiment shown in FIG. 1, that is, by Expression 23 below:

$$SSA=(a11+c12+d11+f12)+(a21+c22+d21+f22)-(a12+c11+d12+f11)-(a22+c21+d22+f21) \quad \text{(Expression 23)}$$

The spherical aberration detection signal SSA is input to the spherical aberration compensation circuit 36 as a control signal for the liquid-crystal phase correctors 122 and 123 of the spherical aberration correction means.

The optical head device 202 and the optical disk apparatus 302 of the second embodiment can produce the same effect as the optical head device 201 and the optical disk apparatus 301 according to the first embodiment. Further, except for the above-described respects, the second embodiment is the same as the first embodiment.

Third Embodiment

Figure 23:
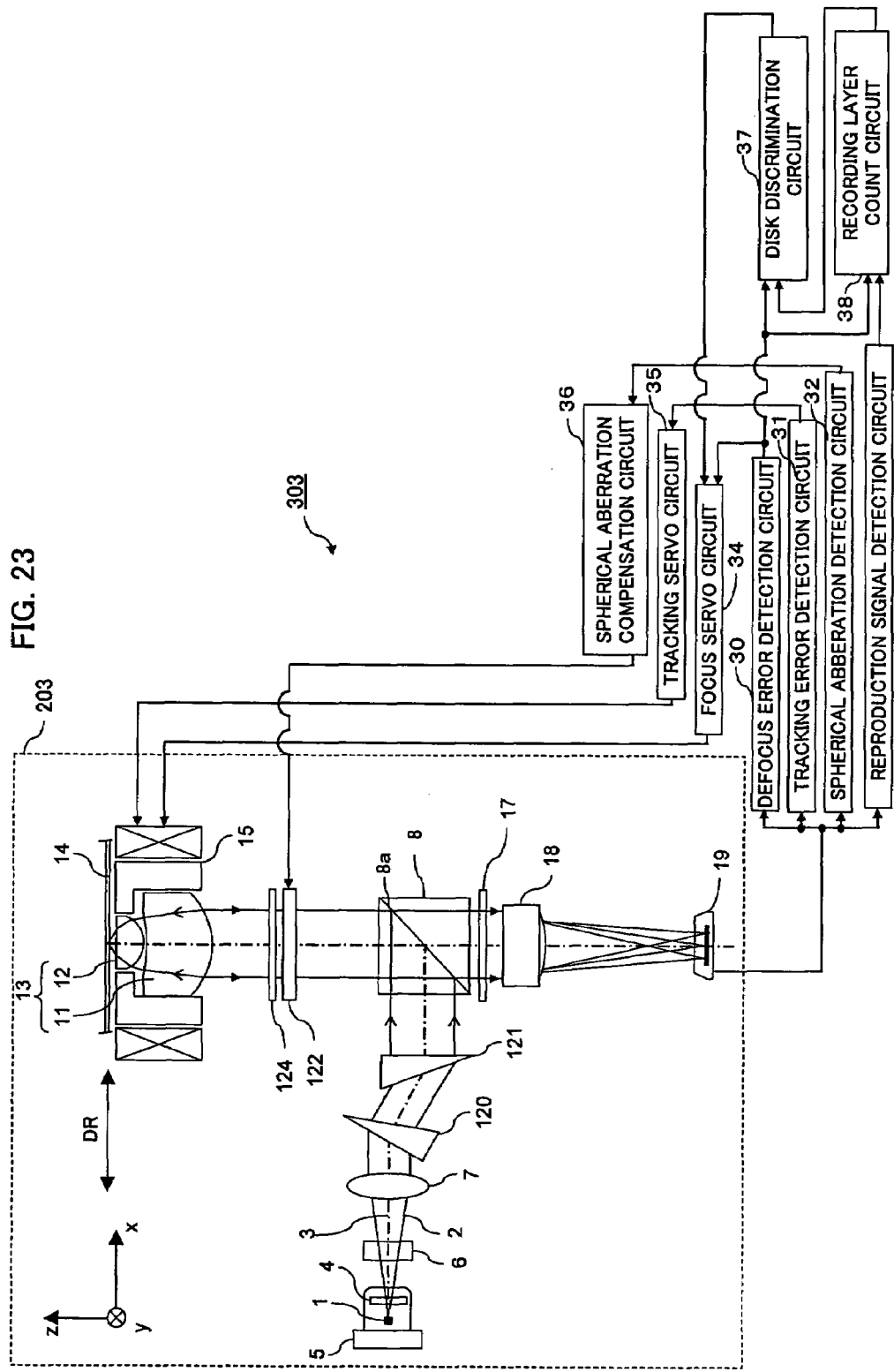
FIG. 23 is a diagram showing a basic configuration of an optical head device and an optical disk apparatus according to the third embodiment of the present invention.

FIG. 23 is a diagram showing a basic configuration of an optical head device 203 and an optical disk apparatus 303 according to the third embodiment of the present invention. In FIG. 23, components that are the same as or correspond to components shown in FIG. 20 (second embodiment) are denoted by the same reference characters. The optical head device 203 according to the third embodiment differs from the optical head device 202 according to the second embodiment (FIG. 20) which adopts a configuration for correcting a spherical aberration generated in both the incoming path and the outgoing path with respect to the reflection surface of the optical disk 14, in that the optical head device according to the third embodiment adopts a configuration for correcting an aberration for the incoming path only. The third embodiment shown in FIG. 23 adopts the hologram element 17 and the photodetector 19 used in the device according to the first embodiment shown in FIG. 1 and the astigmatic detection method, but the knife edge detection used in the embodiment shown in FIG. 20 may also be adopted.

Accordingly, the photodetector receives the light beam, in which the spherical aberration generated in the incoming path remains. As a result, the defocus detection is carried out by the light beam having the same spherical aberration phase distribution as shown in FIG. 9, irrespective of whether the spherical aberration correction is performed or the spherical aberration correction is incompletely performed.

If the same hologram element 17 and the photodetector 19 as used in the first embodiment shown in FIG. 1 are adopted, the deterioration of the defocus detection signal can be suppressed. Further, variations in the zero-cross point of the defocus detection signal can be suppressed by specifying $\alpha$ and $\beta$ of the hologram element 17 in accordance with Expression 12, Expression 15, and Expression 16, in the same manner as the first embodiment, and therefore the same effect as produced by the optical head device 201 and the optical disk apparatus 301 according to the first embodiment can be obtained.

Furthermore, in the third embodiment, since a liquid-crystal phase corrector for correcting spherical aberration in the outgoing path is not needed, the number of elements and cost can be reduced in comparison with a configuration that requires a liquid-crystal phase corrector in both the incoming path and the outgoing path.

Fourth Embodiment

An optical head device and an optical disk apparatus according to the fourth embodiment of the present invention have the same basic configuration as the optical head devices 201, 201*a*, 202, and 203 and the optical disk apparatus 301, 301*a*, 302, and 303 according to the first to third embodiments of the present invention. The fourth embodiment differs from the first to third embodiments in that a sum of the first defocus detection signal FES1 generated by the first area 40 (FIG. 2) of the hologram element 17 and the third defocus detection signal FES3 generated by the third area 42 (FIG. 2), that is, the defocus detection signal FES13 (=FES1+FES3) is used. In the fourth embodiment, a focus operation selection means 34*a* selects whether the focus servo circuit 34 controls the light converging spot moving means 15 in accordance with either the sum signal FES13 of a first ray detection signal and a third ray detection signal or the second ray detection signal FES2. A gain adjustment means may also be provided to adjust the amplitude of the sum signal FES13 of the first ray detection signal and the third ray detection signal or the amplitude of the second ray detection signal FES2, selected by the focus operation selection means 34*a*.

Figure 24:
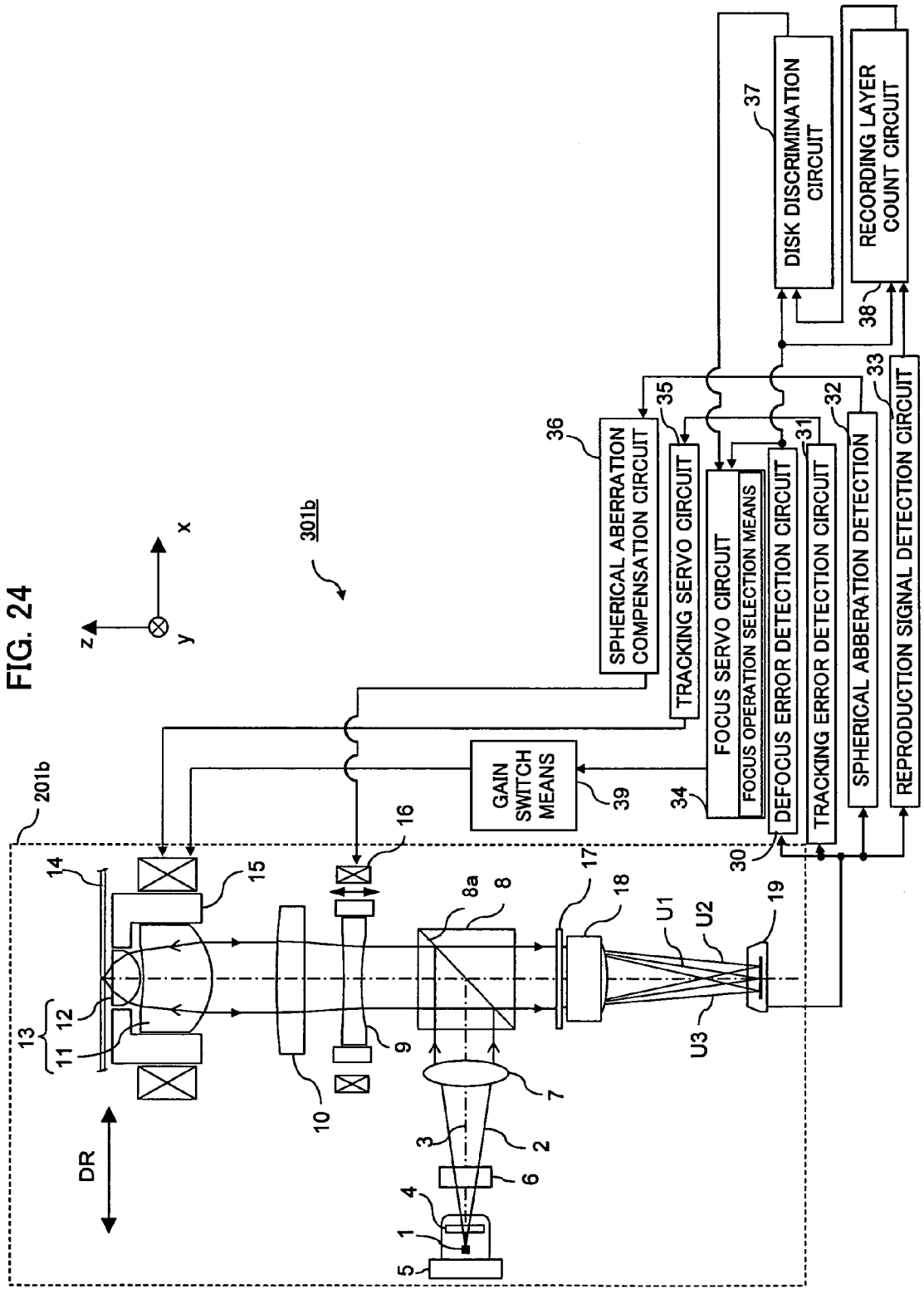
FIG. 24 is a diagram showing a basic configuration of an optical head device and an optical disk apparatus according to the fourth embodiment of the present invention.

FIG. 24 is a diagram showing a basic configuration of an optical head device 201*b* and an optical disk apparatus 301*b* according to the fourth embodiment of the present invention. The optical disk apparatus 301*b* according to the fourth embodiment differs from the optical disk apparatus 301 according to the first embodiment in that the focus operation selection means 34*a* is added and the defocus detection signal FES13 is used as a determination signal for extracting a recording layer (hereafter referred to as a target layer) of a multilayer recording disk where a focus servo operation is carried out.

The optical disk apparatus 301*b* according to the fourth embodiment includes a focus operation selection means for determining whether or not the defocus detection signal FES13 is a defocus detection signal detected in the target layer by observing whether or not the amplitude $AM_{FES13}$ of the defocus detection signal FES13 exceeds a predetermined threshold level $TH_{FES13}$, and for allowing a focus servo operation for a defocus detection signal waveform determined to be detected in the target layer. The focus operation selection means is included in a focus servo circuit 34 (FIG. 1, FIG. 19, FIG. 20, or FIG. 23), for example (see the reference characters 34*a* in FIG. 24). The predetermined threshold level $TH_{FES13}$ is specified so that just the defocus detection signal amplitude detected in the target layer exceeds the predetermined threshold level $TH_{FES13}$. The difference in amplitude of the defocus detection signals of the recording layers is an important factor for enabling the focus operation selection means in the focus servo circuit 34 to determine the target layer more accurately. Accordingly, a greater difference from the amplitude of the defocus detection signals detected in the target layer is better for a determination made in accordance with the difference in amplitude of the defocus detection signal, in providing a sufficient judgment margin. In other words, it should be harder to detect the defocus detection signal outside the target layer than in the target layer.

In the fourth embodiment of the present invention, the amplitude of the defocus detection signal FES13 detected outside the target layer can be reduced while the amplitude of the defocus detection signal FES13 of the target layer does not deteriorate if spherical aberration is almost corrected for the target layer. Accordingly, the focus servo operation to the target layer can be more correctly performed.

Figure 25:
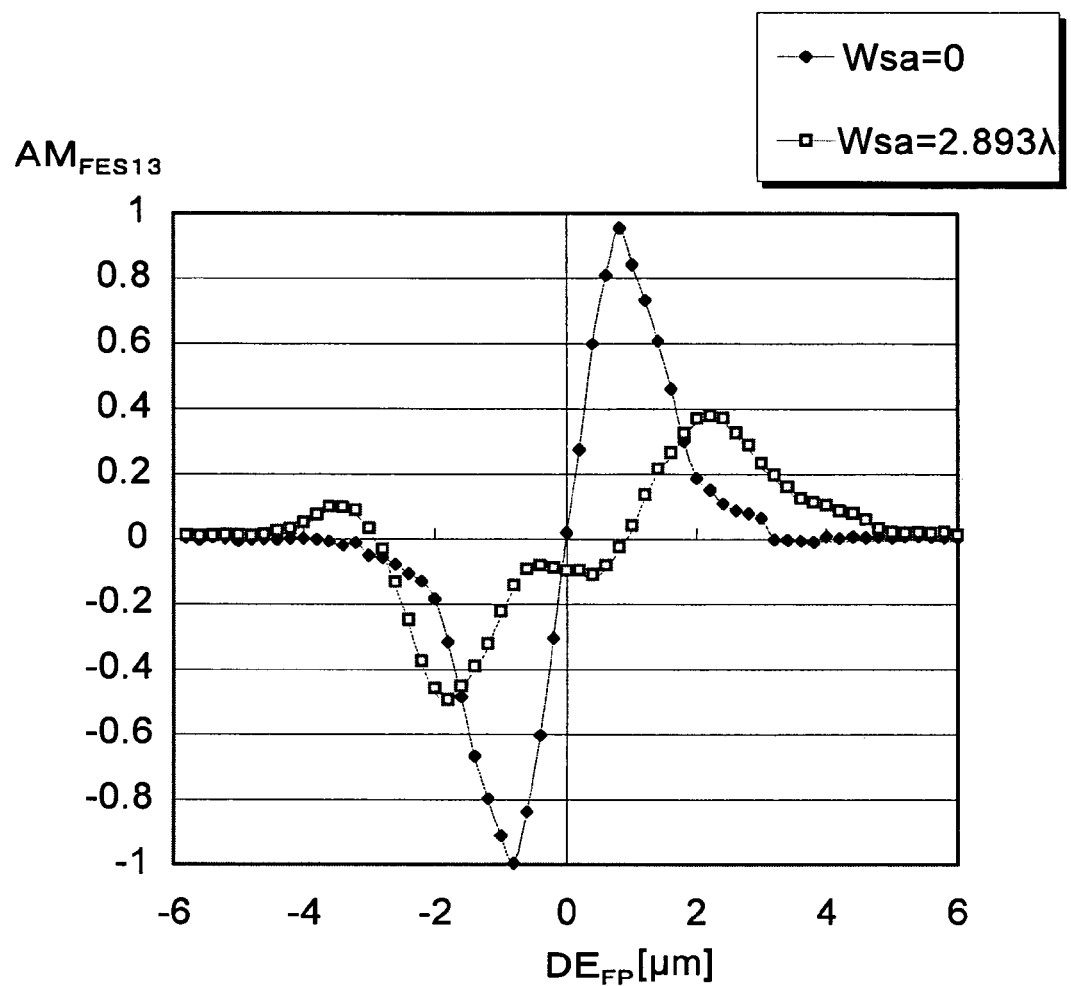
FIG. 25 is a view showing a calculated result of a waveform of the defocus detection signal according to the fourth embodiment of the present invention.

FIG. 25 is a diagram showing calculated results of a waveform of the defocus detection signal FES13 according to the fourth embodiment of the present invention. In FIG. 25, the horizontal axis represents the defocusing amount $DE_{FP}$ (µm); the zero point indicates that the focus position is on the target layer of the optical disk; a point to the right of the zero point (positive side) indicates that the focus position is closer than the target layer of the optical disk; and a point to the left of the zero point (negative side) indicates that the focus position is further than the target layer of the optical disk. Further, in FIG. 25, the vertical axis represents the amplitude $AM_{FES13}$ of the defocus detection signal FES13, and a point where the amplitude $AM_{FES}$ is 0 is a zero-crossing point. FIG. 25 shows an example of calculated results when $\alpha \approx 0.65$ and $\beta \approx 0.75$. As shown by plots of $W_{SA}=2.893\lambda$ in FIG. 25, the amplitude of the defocus detection signal FES13 according to the fourth embodiment can be brought smaller than conventional defocus detection signal FES when spherical aberration remains, and the use of the defocus detection signal FES13 is advantageous in terms of difference in amplitude. Furthermore, if the set values of $\alpha$ and $\beta$ are determined in accordance with the target specifications of the optical head device according to the fourth embodiment in the same way of thinking as adopted to the apparatus according to the first embodiment, the amplitude of the defocus detection signal FES13 can deteriorate efficiently.

As a result, the amplitude of the defocus detection signal FES13 according to the fourth embodiment is lower than that of the conventional defocus detection signal FES due to spherical aberration caused by a difference in thickness of the substrate, so that a margin from the predetermined threshold level $TH_{FES13}$ to be used as the reference of target layer determination widens and a correct judgment can be made. The defocus detection signal FES13 is generated by the defocus detection circuit 30 (FIG. 1, FIG. 19, FIG. 20, or FIG. 23) and input to the focus servo circuit 34, in the same manner as the first to third embodiments of the present invention, and the focus servo operation of the focus servo circuit 34 can be allowed only when the layer is determined to be the target layer as described above.

Furthermore, the reliability of the focus servo operation can also be improved as described below. A gate signal is generated, wherein the gate signal goes high in a segment of the defocus detection signal FES13 having amplitude not lower than the predetermined threshold level $TH_{FES13}$ from when a first peak is detected in the positive side until when a second peak is detected in the negative side, and is kept zero in the other segment. The generated gate signal may go high in a segment where the level of the sum of the light amount of all the received beams reaches or exceeds the predetermined threshold level.

Next, a multiplied signal obtained by multiplying the gate signal by the defocus detection signal FES13 is generated. The multiplied signal is detected just in a target recording layer. If the multiplied signal is used as a focus servo control signal, the focus servo with respect to the target layer can be made with a high reliability.

The above-described configuration has the following effect. There are cases where the focus servo operation cannot be performed properly during the focus servo operation in progress or at startup of the focus servo operation because of the load of an external impact, instability of the servo operation, or the like. In that case, if a defocus detection signal is detected in each recording layer of a multilayer disk in the same way as the conventional defocus detection signal, the judgment of the target layer is disregarded and the servo circuit may start the servo operation to something other than the target layer unexpectedly. However, with the multiplied signal, a defocus detection signal is not output in a layer other than the target layer, as described earlier, so that there is no fear of an unexpected servo jump to a layer other than the target layer, and the focus servo operation to the target layer is naturally ensured.

Figure 26:
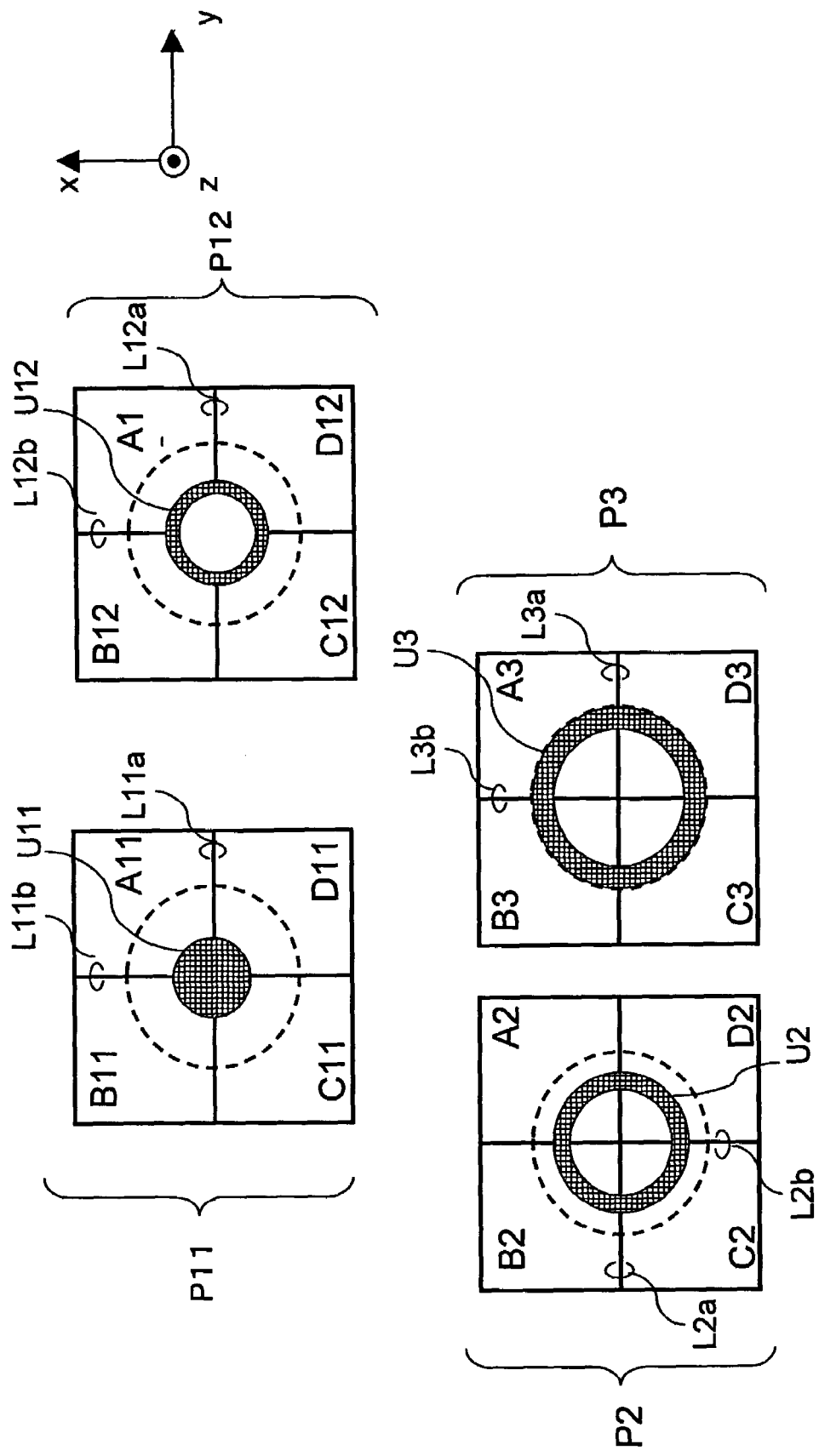
FIG. 26 is a schematic diagram showing a light-receiving area pattern of an optical head device according to the fourth embodiment when four photodetectors are provided, and the ray on each photoreceptor.

In the description given above, the hologram element 17 (FIG. 2) is divided into three concentric areas, but the element may be divided into four or more concentric areas. For example, the first area 40 is divided into concentric areas meeting the condition of Expression 12 by r=0, which is innermost circular ray U11 containing the central point 51 and the annular ray U12 outside the circular ray U11. Like the second ray U2 and the third ray U3, the circular ray U11 and the annular ray P12 are received respectively by four-division photoreceptors P11 and P12 including four light receiving area formed by at least two crossing separation boundaries, and the defocus detection signal FES11 and the defocus detection signal FES12 can be detected. FIG. 26 is a schematic diagram showing a light-receiving area pattern of a photodetector including four photoreceptors, of the optical head device according to the fourth embodiment, and the ray on each photoreceptor. The schematic diagram of FIG. 26 shows the pattern of the light receiving areas of the photodetector and rays U11, U12, U2, and U3 on the photoreceptors P11, P12, P2, and P3 of the photodetector.

The rays is split or shared into four parts by the hologram element, and the photoreceptors P11, P12, P2, and P3 of the photodetector shown in FIG. 26 are irradiated with the four rays. The photodetector 19 is disposed in such a manner that the separation boundaries L11$a$, L12$a$, L2$a$, and L3$a$ of the photoreceptors P11, P12, P2, and P3 become almost parallel to a tangential direction of the optical disk 14 (y-axis direction in FIG. 1) and the separation boundaries L11$b$, L12$b$, L2$b$, and L3$b$ of the photoreceptors P11, P12, P2, and P3 become almost parallel to a radial direction DR of the optical disk 14 (x-axis direction in FIG. 1). The photoreceptor P11 includes four light receiving areas A11, B11, C11, and D11 divided by the separation boundaries L11$a$ and L11$b$. Further, the photoreceptor P12 includes four light receiving areas A12, B12, C12, and D12 divided by the separation boundaries L12$a$ and L12$b$. Furthermore, the photoreceptor P2 includes four light receiving areas A2, B2, C2, and D3 divided by the separation boundaries L2$a$ and L2$b$, and the photoreceptor P3 includes four light receiving areas A3, B3, C3, and D3 divided by the separation boundaries L3$a$ and L3$b$. In this configuration, a focus operation selection means (corresponding to reference character 34$a$ in FIG. 26) selects whether the focus servo circuit 34 controls the light converging spot moving means 15 by a sum signal of a detection signal of the ray U12 and a detection signal of the ray U3 or by a detection signal of the ray U2. A gain adjustment means 39 (FIG. 24) may also be provided to adjust the amplitude of the sum signal of the detection signal of the ray U12 and the detection signal of the ray U3 or by the detection signal of the ray U2, selected by the focus operation selection means 34$a$.

If the four-division ray is used, when the annular ray U12 and ray U3 are used, i.e., when the defocus detection signal FES123 obtained as a sum of the defocus detection signal FES12 and the third defocus detection signal FES3 is used, the annular ray around r=1/$\sqrt{2}$ and the circular ray U11 containing another condition of r=0 of Expression 12 are eliminated, so that amplitude deterioration due to spherical aberration can be extended in comparison with the defocus detection signal FES13.

The first to fourth embodiments of the present invention include a hologram element 17 as a means for splitting the light beam reflected from the optical disk 14 into concentric areas and generating at least one circular ray and two annular rays, and photoreceptors for receiving the circular ray and the annular ray formed by concentric division. The first to fourth embodiments obtain a plurality of defocus detection signals detected and a plurality of tracking error detection signals detected by the photoreceptors and a plurality of total light amount signals received by the photoreceptor of light. Any of the first to third embodiments of the present invention and the fourth embodiment of the present invention can be configured in a common optical system by optimizing the design of the hologram element 17 so that at least circular ray U11, the annular ray U12, the second ray U2, and the third ray U3 can be obtained simultaneously. In other words, the second defocus detection signal FES2 of which amplitude deterioration due to spherical aberration is relatively small as described in the first to third embodiments of the present invention and the defocus detection signal FES13 or the defocus detection signal FES123 of which amplitude deterioration due to spherical aberration is relatively great as described in the fourth embodiment of the present invention can be simultaneously detected. Accordingly, the optical system can be simplified.

In that case, if a switch circuit that can select or combine a plurality of defocus detection signals, a plurality of tracking error detection signals, and a plurality of total light amount signals detected by the photoreceptors selectively is provided, the input signals of the focus servo circuit 34, the tracking servo circuit 35, the spherical aberration compensation circuit 36, the disk discrimination circuit 37, and the recording layer count circuit 38 can be switched as needed.

Further, a gain adjustment circuit may also be provided to convert the signal level so that the levels of the input signals of the focus servo circuit 34, the tracking servo circuit 35, the spherical aberration compensation circuit 36, the disk discrimination circuit 37, and the recording layer count circuit 38 may not change greatly when the signals are selected in accordance with the operating state of the optical head device.

Furthermore, the means for splitting the light beam reflected from the optical disk 14 concentrically into at least one circular ray and two annular rays is not limited to the hologram element 17. For example, a liquid crystal aperture element configured by combining a liquid crystal element and a polarizing plate that can partially change the polarizing state of the light beam may be used in stead, to switch the transmissive area and the non-transmissive area in accordance with an external voltage, and the configurations of the first to fourth embodiments of the present invention may be selectively switched in accordance with the operating state of the optical head device.

The light beam can also be split by a liquid crystal aperture element. In that case, the liquid crystal aperture element should be formed so that the position of the maximum modulation component of the RF reproduction signal becomes between the highest peak position and the lowest peak position of the defocus detection signal in the split light pattern formed by the liquid crystal aperture element, in the same manner as the first to third embodiments. If the liquid crystal aperture element is used to divide the light beam, the light beam can be partially passed or blocked, so that some of the plurality of photoreceptors can be replaced by a single photoreceptor. The configuration of the photoreceptor can be simplified, and there will be merit in cost.

The invention claimed is:

1. An optical head device comprising:
a light source for emitting a light beam;
a light converging means for converging the light beam onto an optical disk;
a light converging spot moving means for moving a position of a focus of a light converging spot formed by the light beam converged by the light converging means, in a direction perpendicular to a recording surface of the optical disk;
a light beam splitting means for splitting the light beam converged by the light converging means and reflected from the optical disk into a plurality of split light beams; and
a light sensing means which includes at least one photoreceptor including a plurality of split light receiving areas, the light sensing means outputting an electric signal corresponding to a light amount of the split light beam entering each of the plurality of split light receiving areas or an electric signal corresponding to a combined light amount of the split light beams entering the plurality of split light receiving areas;
wherein the plurality of split light beams split by the light beam splitting means includes
a circular ray or a pair of semi-circular rays; and
at least two annular rays or at least two pairs of semi-annular rays, which are rays outside the circular ray or the semi-circular rays.

2. The optical head device according to claim 1, further comprising a spherical aberration adding means for adding spherical aberration to the light beam.

3. The optical head device according to claim 1, wherein the annular ray or the semi-annular rays include a ray satisfying that $(\alpha+\beta)/2$ is substantially $1/\sqrt{2}$, where an effective ray radius of the light converging means is 1, a normalized inner radius of the annular ray or the semi-annular ray is $\alpha$, and a normalized outer radius of the annular ray or the semi-annular ray is $\beta$.

4. The optical head device according to claim 1, wherein the annular ray or the semi-annular rays include a ray satisfying that $\beta$ is substantially equals to $(1-\alpha^2)^{1/2}$ and $(\alpha+\beta)/2$ is smaller than $1/\sqrt{2}$, where an effective ray radius of the light converging means is 1, a normalized inner radius of the annular ray or the semi-annular ray is $\alpha$, and a normalized outer radius of the annular ray or the semi-annular ray is $\beta$.

5. The optical head device according to claim 1, wherein the light beam splitting means includes a hologram element.

6. The optical head device according to claim 5, wherein the light beam splitting means together with the light converging means can be moved by the light converging spot moving means.

7. The optical head device according to claim 2, wherein the light beam splitting means is disposed between the spherical aberration adding means and the light sensing means.

8. The optical head device according to claim 2, wherein the light beam splitting means is disposed between the light converging means and the spherical aberration adding means.

9. The optical head device according to claim 8, wherein the light beam splitting means is a polarizing hologram element;

the optical head device further comprising a quarter wavelength plate disposed adjacent to the polarizing hologram element.

10. The optical head device according to claim 2, wherein the light beam splitting means includes a liquid crystal aperture element including a plurality of areas where passing or blocking of the input ray can be controlled.

11. The optical head device according to claim 2, wherein the spherical aberration adding means includes:
a first lens disposed on a side of the light source;
a second lens disposed on a side of the light converging means; and
a driving means for changing a distance between the first lens and the second lens in a direction of an optical axis of the first lens and the second lens.

12. The optical head device according to claim 2, wherein the spherical aberration adding means includes:
a first liquid-crystal phase modulating element for performing phase modulation of the light beam converged by the light converging means;
a second liquid-crystal phase modulating element, an optical axis of which is displaced by 90 degrees from an optical axis of the first liquid-crystal phase modulating element; and
a quarter wavelength plate disposed in a position between the first liquid-crystal phase modulating element and the light converging means and between the second liquid-crystal phase modulating element and the light converging means.

13. The optical head device according to claim 2, wherein the spherical aberration adding means includes:
a first liquid-crystal phase modulating element for performing phase modulation of the light beam converged by the light converging means; and
a quarter wavelength plate disposed between the first liquid-crystal phase modulating element and the light converging means.

14. The optical head device according to claim 1, further comprising an optical sensing means which has a lens function of converging the plurality of split light beams onto a plurality of split light receiving areas of the light sensing means.

15. The optical head device according to claim 14, wherein the optical sensing means has an astigmatic adding function;
the plurality of light receiving areas are formed by separating the light receiving surface of the photoreceptor into four parts by separation boundaries intersecting at right angles; and
the light receiving area receives at least one of the split light beams for astigmatic defocus detection.

16. The optical head device according to claim 1, wherein the separation boundary of the pair of semi-circular rays is a diametric line substantially parallel to a radial direction of the optical disk;
the separation boundaries of at least the two pairs of semi-annular rays are a diametric line substantially parallel to the radial direction of the optical disk;
the photoreceptor of the light receiving means includes a plurality of two-division light receiving areas divided by the separation boundary substantially parallel to the radial direction of the optical disk; and
the light receiving area receives at least one of the semi-annular rays or the semi-circular rays, which are split light beams split by the light beam splitting means, thereby detecting defocus using knife-edge method.

17. The optical head device according to claim 15, wherein outer four corners of the light receiving areas or part of the corners are removed or divided.

18. An optical disk apparatus comprising:
the optical head device of claim 1;
a defocus detection circuit for generating a defocus signal of the focus position of the light converging means with respect to the optical disk, from an electric signal output from the light sensing means of the optical head device; and
a focal position control circuit for controlling a position of the light converging spot moving means;
wherein the focal position control circuit controls the focus position of the light converging means by controlling the light converging spot moving means in accordance with the defocus signal.

19. An optical disk apparatus comprising the optical head device of claim 2, wherein
the circular ray or the pair of semi-circular rays include a first ray, and
the at least two annular rays or the at least two pairs of semi-annular rays include a second ray and a third ray outside the second ray;
the optical disk apparatus further comprising:
a focus servo circuit for controlling the light converging spot moving means in accordance with the second defocus detection signal corresponding to the second ray; and
a spherical aberration compensation circuit for controlling the spherical aberration correction means in accordance with the first defocus detection signal corresponding to the first ray and the third defocus detection signal corresponding to the third ray.

20. The optical disk apparatus according to claim 19, wherein the control of the spherical aberration correction means by the spherical aberration compensation circuit is performed in such a manner that a spherical aberration detection signal, which is a differential signal between the first defocus detection signal corresponding to the first ray and the third defocus detection signal corresponding to the third ray, becomes zero.

21. An optical disk apparatus comprising:
the optical head device of claim 1;
a defocus detection circuit for generating a defocus signal of the focus position of the light converging means with respect to the optical disk, from an electric signal output from the light sensing means of the optical head device; and
a recording layer count detection circuit for detecting the number of recording layers of the optical disk in accordance with the defocus signal output from the defocus detection circuit;
wherein the recording layer count detection circuit detects the number of recording layers of the optical disk in accordance with an amplitude level of the defocus signal.

22. An optical disk apparatus comprising:
the optical head device of claim 1;
a defocus detection circuit for generating a defocus signal of the focus position of the light converging means with respect to the optical disk, from an electric signal output from the light receiving element of the optical head device; and
a disk discrimination circuit for detecting a type of the optical disk;
wherein the disk discrimination circuit detects the type of the optical disk in accordance with an amplitude level of the defocus signal.

23. The optical disk apparatus according to claim 22, further comprising:
a recording layer count detection circuit for detecting the number of recording layers of the optical disk,
wherein the recording layer count detection circuit detects a total number of the recording layers of the optical disk in accordance with the amplitude level of the defocus signal.

24. The optical disk apparatus according to claim 22, further comprising:
a spherical aberration detection circuit for detecting an amount of a spherical aberration of a light converging spot formed by the light beam converged by the light converging means, in accordance with an electric signal output from the light sensing means of the optical head device;
wherein the spherical aberration detection circuit detects the amount of the spherical aberration in accordance with a level of another defocus signal when at least one signal level of the defocus signals generated by the defocus detection circuit becomes zero.

25. An optical disk apparatus comprising:
the optical head device of claim 2;
a defocus detection circuit for generating a defocus signal of the focus position of the light converging means with respect to the optical disk, from an electric signal output from the light sensing means of the optical head device; and
a spherical aberration detection circuit for detecting an amount of a spherical aberration of a light converging spot formed by the light beam converged by the light converging means, from an electric signal output from the light sensing means of the optical head device;
wherein the spherical aberration adding means is controlled to operate in accordance with the detection signal output from the spherical aberration detection circuit.

26. An optical disk apparatus comprising the optical head device of claim 1, wherein
the circular ray or the pair of semi-circular rays include a first ray; and
the at least two annular rays or the at least two pairs of semi-annular rays include a second ray and a third ray outside the second ray;
the optical disk apparatus further comprising:
a focus servo circuit for controlling the light converging spot moving means in accordance with a second defocus detection signal corresponding to the second ray; and
a focus operation selection means for determining whether amplitude of a defocus detection signal obtained by adding a first defocus detection signal corresponding to the first ray and a third defocus detection signal corresponding to the third ray exceeds a predetermined threshold level, the focus operation selection means allowing a focus servo operation just for the defocus detection signal waveform determined to be greater than the predetermined threshold level.

27. An optical disk apparatus comprising the optical head device of claim 1, wherein
the circular ray or the pair of semi-circular rays include a first ray;
the at least two annular rays or the at least two pairs of semi-annular rays include a second ray and a third ray outside the second ray; and the light beam splitting means includes a first circular area for generating the first ray, a second annular area for generating the second ray, and a third annular area for generating the third ray;

wherein the light beam splitting means forms the second area in such a manner that a maximum modulation component of a reproduction signal by the optical head device becomes between a highest peak position and a lowest peak position of the second defocus detection signal corresponding to the second ray.

28. An optical disk apparatus comprising the optical head device of claim 1, wherein the circular ray or the pair of semi-circular rays include a first ray; and the at least two annular rays or the at least two pairs of semi-annular rays include a second ray and a third ray outside the second ray;

the optical disk apparatus further comprising:

a focus servo circuit for controlling the light converging spot moving means in accordance with a sum signal of a detection signal of the first ray and a detection signal of the third ray.

29. The optical disk apparatus according to claim 28, further comprising:

a switching means for selecting whether the focus servo circuit controls the light converging spot moving means in accordance with a sum signal of a detection signal of the first ray and a detection signal of the third ray or a detection signal of the second ray.

30. The optical disk apparatus according to claim 28, further comprising:

a gain adjustment means for adjusting amplitude of a sum signal of a detection signal of the first ray and a detection signal of a third ray or amplitude of a detection signal of the second ray, selected by the switching means.

31. An optical disk apparatus comprising the optical head device of claim 1, wherein the circular ray or the pair of semi-circular rays include a first ray; and the at least two annular rays or the at least two pairs of semi-annular rays include a second ray, a third ray outside the second ray, and a fourth ray outside the third ray;

the optical disk apparatus further comprising:

a focus servo circuit for controlling the light converging spot moving means in accordance with a sum signal of a detection signal of the second ray and a detection signal of the fourth ray.

32. The optical disk apparatus according to claim 31, further comprising:

a switching means for selecting whether the focus servo circuit controls the light converging spot moving means in accordance with a sum signal of a detection signal of the second ray and a detection signal of the fourth ray or a detection signal of the third ray.

33. The optical disk apparatus according to claim 32, further comprising:

a gain adjustment means for adjusting amplitude of a sum signal of a detection signal of the second ray and a detection signal of the fourth ray or amplitude of a detection signal of the third ray, selected by the switching means.

* * * * *